(12) United States Patent
Yoon et al.

(10) Patent No.: US 12,379,627 B2
(45) Date of Patent: Aug. 5, 2025

(54) DISPLAY APPARATUS INCLUDING LIGHT SOURCES HAVING DIFFERENT WAVELENGTHS

(71) Applicant: SAMSUNG ELECTRONICS CO., LTD., Suwon-si (KR)

(72) Inventors: Daewon Yoon, Suwon-si (KR); Byeol Park, Suwon-si (KR); Mugong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/296,636

(22) Filed: Apr. 6, 2023

(65) Prior Publication Data
US 2023/0314876 A1 Oct. 5, 2023

Related U.S. Application Data

(63) Continuation of application No. PCT/KR2023/003031, filed on Mar. 6, 2023.

(30) Foreign Application Priority Data

Mar. 16, 2022 (KR) .................. 10-2022-0032971
Jul. 6, 2022 (KR) .................. 10-2022-0083214

(51) Int. Cl.
*G02F 1/1335* (2006.01)
*G02F 1/13357* (2006.01)

(52) U.S. Cl.
CPC ......... *G02F 1/133612* (2021.01); *G02F 1/133514* (2013.01); *G02F 1/133603* (2013.01); *G02F 1/133606* (2013.01)

(58) Field of Classification Search
CPC ......... G02F 1/133603; G02F 1/133514; G02F 1/136222; G02F 1/133612;
(Continued)

(56) References Cited

U.S. PATENT DOCUMENTS 8,646,939 B2  2/2014  Bues et al.
9,851,489 B2  12/2017 Bang et al.
(Continued)

FOREIGN PATENT DOCUMENTS

JP  2005-63687 A   3/2005
JP  2009-533127 A  9/2009
(Continued)

OTHER PUBLICATIONS

PCT Search Report dated Jun. 19, 2023 for PCT Application No. PCT/KR2023/003031.
(Continued)

*Primary Examiner* — Jonathan Y Jung
(74) *Attorney, Agent, or Firm* — Nixon & Vanderhye P.C.

(57) ABSTRACT

An display apparatus may include a liquid crystal; a color filter overlapping the liquid crystal; a backlight unit to supply light to the liquid crystal and including a first light source emitting light of a first wavelength and a second light source emitting a second wavelength different from the first wavelength; a first power supply part to supply a first current to the first light source; a second power supply part to supply a second current to the second light source; and a processor which may control the first power supply part and the second power supply part so that the first and second currents are simultaneously supplied to the first light source and the second light source. The processor may control the first power supply part and the second power supply part so that intensity of the first current supplied to the first light source is different from intensity of the second current supplied to the second light source.

20 Claims, 23 Drawing Sheets

(58) Field of Classification Search
CPC ............ G02F 1/133606; G02B 6/0073; Y10S 362/80; G09G 2320/0626; G09G 2320/0666; G09G 3/3426
See application file for complete search history.

(56) References Cited

U.S. PATENT DOCUMENTS

| | | | |
|---|---|---|---|
| 10,082,614 B2 | 9/2018 | Bang et al. | |
| 10,114,247 B2 | 10/2018 | Lee | |
| 10,269,285 B2 | 4/2019 | Lee et al. | |
| 10,923,013 B2 | 2/2021 | Chen et al. | |
| 10,953,191 B2 | 3/2021 | Mok et al. | |
| 2009/0281604 A1* | 11/2009 | De Boer | A61M 21/00 345/83 |
| 2010/0123401 A1 | 5/2010 | Park et al. | |
| 2011/0267563 A1* | 11/2011 | Shimizu | G02B 6/008 362/606 |
| 2012/0259392 A1 | 10/2012 | Feng et al. | |
| 2015/0102748 A1 | 4/2015 | Lee | |
| 2015/0227002 A1 | 8/2015 | Won et al. | |
| 2016/0338181 A1* | 11/2016 | Schuch | H05B 47/16 |
| 2020/0150491 A1* | 5/2020 | Jang | H05B 45/20 |
| 2020/0274025 A1* | 8/2020 | Wang | H10H 20/812 |
| 2022/0086988 A1* | 3/2022 | Coleman | H05B 47/11 |
| 2022/0341566 A1* | 10/2022 | Kim | F21V 5/008 |

FOREIGN PATENT DOCUMENTS

| | | |
|---|---|---|
| JP | 5134617 B2 | 11/2012 |
| KR | 10-2010-0056306 A | 5/2010 |
| KR | 20110098845 A | 9/2011 |
| KR | 10-2012-0045968 A | 5/2012 |
| KR | 10-2015-0042113 A | 4/2015 |
| KR | 10-2015-0093900 A | 8/2015 |
| KR | 101574063 B1 | 12/2015 |
| KR | 10-2017-0014755 A | 2/2017 |
| KR | 10-2017-0030700 A | 3/2017 |
| KR | 20170080895 A | 7/2017 |
| KR | 10-2021-0025290 A | 3/2021 |
| KR | 102349859 B1 | 1/2022 |
| WO | 2020221448 A1 | 11/2020 |

OTHER PUBLICATIONS

PCT Written Opinion dated Jun. 19, 2023 for PCT Application No. PCT/KR2023/003031.
Lucas et al., "Measuring and using light in the melanopsin age", Trends in Neurosciences, Jan. 2014, vol. 37, No. 1, 10 pages.
Extended European Search Report dated Feb. 24, 2025 for EP Application No. 23771014.0.

* cited by examiner

DISPLAY APPARATUS INCLUDING LIGHT SOURCES HAVING DIFFERENT WAVELENGTHS

CROSS REFERENCE TO RELATED APPLICATION

This application is a continuation of International Application PCT/KR2023/003031, filed Mar. 6, 2023, which is based on and claims priority on KR Patent Application No. 10-2022-0032971 filed on Mar. 16, 2022, and KR Patent Application No. 10-2022-0083214 filed on Jul. 6, 2022, the disclosures of which are all hereby incorporated herein by reference in their entireties.

BACKGROUND

Field

Certain example embodiments relate to a display apparatus, and for example, to a display apparatus having a backlight unit with at least two light sources having different wavelengths.

Description of Related Art

Most mammals, including humans, have evolved to recognize it as day when retinal cells detect sky blue in the range of 475 nm to 505 nm, which is the color of sunlight reflected from the stratosphere.

Based on this, the human body suppresses the secretion of melatonin and secretes serotonin during the day. Conversely, at night, that is, when there is no color in the range of 475 nm to 505 nm, the human body secretes melatonin and suppresses the secretion of serotonin.

A display apparatus includes a liquid crystal panel for displaying an image and a backlight unit for supplying light to the liquid crystal panel. The backlight unit includes a light source, and when the light source is turned on, light is emitted and supplied to the liquid crystal panel. The liquid crystal panel displays an image using light emitted from the backlight unit.

A general display apparatus is formed without considering the human circadian rhythm. For example, a general display apparatus is configured to display an image using light of a range recognized by the human body as night all day long, and thus may adversely affect the human body.

SUMMARY

An display apparatus according to an example embodiment may include a liquid crystal; a color filter overlapping the liquid crystal; a backlight unit configured to supply light to the liquid crystal and including a first light source emitting light of a first wavelength and a second light source emitting a second wavelength different from the first wavelength; a first power supply part configured to supply a first current to the first light source; a second power supply part configured to supply a second current to the second light source; and at least one processor configured to control the first power supply part and the second power supply part so that the first and second currents are simultaneously supplied to the first light source and the second light source. The processor may control the first power supply part and the second power supply part so that intensity of the first current supplied to the first light source is different from intensity of the second current supplied to the second light source.

The processor may control the first power supply part and the second power supply part to supply a maximum or large (e.g., first) current to the second light source and to supply a current less than the maximum or large current to the first light source.

The first power supply part may be formed separately from the second power supply part. The first power supply part may be formed to supply maximum or large current to the first light source.

The first light source may be configured to emit light with a central wavelength(s) within a range of 440 nm to 450 nm, and the second light source may be configured to emit light having a central wavelength(s) within a range of 475 nm to 505 nm.

The first light source and the second light source may be formed of a light emitting diode (LED).

The first light source may include a plurality of blue LEDs, and the second light source may include a plurality of sky blue LEDs. The plurality of blue LEDs and the plurality of sky blue LEDs may be alternately arranged.

The color filter may be formed of a red filter, a green filter, and a transparent portion.

The red filter and the green filter may be of or include a quantum dot film.

The backlight unit may include a light guide plate disposed under the liquid crystal. The first light source and the second light source may be disposed on one side of the light guide plate.

The backlight unit may include a diffusion plate disposed under the liquid crystal. The first light source and the second light source may be disposed below the diffusion plate.

The first light source may include a plurality of blue LEDs, and the second light source may include a plurality of sky blue LEDs. The plurality of blue LEDs and the plurality of sky blue LEDs may be alternately disposed on a plane.

The first light source may be configured to emit light having a central wavelength(s) within a range of 440 nm to 450 nm. The second light source may be configured to emit light having a wavelength(s) within a range of 600 nm to 1000 nm.

The display apparatus may include a third light source disposed in the backlight unit and configured to emit light having a wavelength different from those of the first light source and the second light source; and a third power supply part configured to supply current to the third light source.

The processor may be configured to control the first power supply part, the second power supply part, and the third power supply part to simultaneously supply current to the first light source, the second light source, and the third light source.

BRIEF DESCRIPTION OF DRAWINGS

These and/or other aspects, features, and advantages of certain embodiments of the disclosure will be more apparent from the following description taken in conjunction with the accompanying drawings, in which:

FIG. 10 is a graph illustrating light intensity when both a first light source and a second light source of a display apparatus according to an example embodiment are turned on and light intensity when only the first light source thereof is turned on.

DETAILED DESCRIPTION

Figure 1:
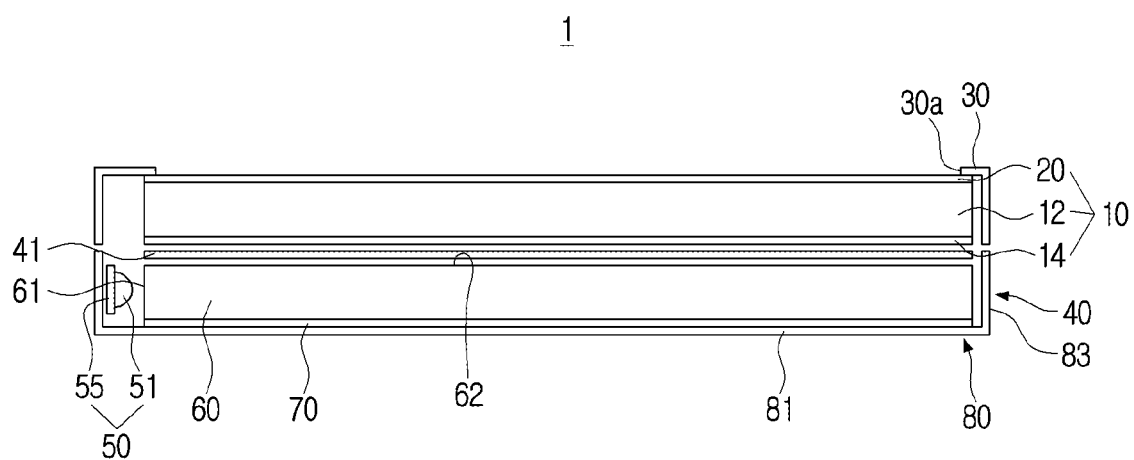
FIG. 1 is a cross-sectional view illustrating a display apparatus according to an example embodiment.

Descriptions below, which takes into reference the accompanying drawings, is provided to assist in a comprehensive understanding of various embodiments of the disclosure as defined by the claims and its equivalent. Although various specific details are included to assist in the understanding herein, the above are to be understood as merely example embodiments. Accordingly, it will be understood by those of ordinary skill in the art that various modifications may be made to various embodiments described herein without departing from the scope and spirit of the disclosure. In addition, descriptions on well-known functions and configurations will be omitted for clarity and conciseness.

Terms and words used in the description below and in the claims are not limited to its bibliographical meaning, and are used merely to assist in a clear and coherent understanding of the disclosure. Accordingly, the description below on the various embodiments of the disclosure are provided simply as examples and it will be clear to those of ordinary skill in the art that the example embodiments as defined by the appended claims and its equivalent are not for limiting the disclosure.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

The expression "configured to" as used in the disclosure means depending on the circumstances, for example, "suitable for," "having the capacity to," "designed to," "adapted to," "made to," or "capable of." The term "configured to" may not necessarily mean only "specifically designed to" in terms of hardware.

Instead, in some contexts, the expression "device configured to" may mean that the device is "capable of" in conjunction with other devices or components. For example, the phrase "a processor configured to perform A, B, and C" may refer to a dedicated processor (e.g., embedded processor) for performing the corresponding operations, or a general-purpose processor (e.g., central processing unit (CPU) or application processor) capable of performing the corresponding operations by executing one or more software programs stored in a memory device.

In the disclosure, "a module" or "a part" performs at least one function or operation, and may be implemented as hardware or software, or as a combination of hardware and software. Also, a plurality of "modules" or "parts" may be integrated into at least one module and implemented as at least one processor, except "modules" or "parts" which need to be implemented as specific hardware. Thus, each "module" and/or "part" herein may comprise circuitry.

According to various embodiments, operations performed by modules, programs, or other components may be executed sequentially, in parallel, iteratively, or heuristically, or at least some operations may be executed in a different order, omitted, or other operations may be added.

Further, the terms 'leading end', 'rear end', 'upper side', 'lower side', 'top end', 'bottom end', etc. used in the disclosure are defined with reference to the drawings. However, the shape and position of each component are not limited by the terms.

Certain example embodiments may provide a display apparatus considering human biorhythms. In addition, certain example embodiments may provide a display apparatus having a good effect on the human body. Hereinafter, embodiments of a display apparatus including light sources having different wavelengths according to an example embodiment will be described with reference to the accompanying drawings.

FIG. 1 is a cross-sectional view illustrating a display apparatus according to an example embodiment.

Referring to FIG. 1, a display apparatus 1 according to an example embodiment may include a liquid crystal 12, a color filter 20, and a backlight unit 40.

The liquid crystal 12 is configured to display an image and may include a plurality of thin film transistors. The plurality of thin film transistors may be formed as a thin film transistor layer 14. The thin film transistor layer 14 may be formed in a shape and size corresponding to the liquid crystal 12. The color filter 20 may be disposed to overlap the liquid crystal 12. The color filter 20 may be disposed on the front or rear side of the liquid crystal 12. The color filter 20 may be formed in a shape and size corresponding to the liquid crystal 12. The color filter 20 may be formed in a thin film shape.

The liquid crystal 12 may be accommodated between the thin film transistor layer 14 and the color filter 20.

In the case of the embodiment shown in FIG. 1, the color filter 20 is disposed on the upper side of the liquid crystal 12, and the thin film transistor layer 14 is disposed on the lower side of the liquid crystal 12. However, the arrangement of the color filter 20 and the thin film transistor layer 14 is not limited thereto.

Alternatively, the thin film transistor layer 14 may be disposed on the upper side of the liquid crystal 12 and the color filter 20 may be disposed on the lower side of the liquid crystal 12.

The color filter 20, the liquid crystal 12, and the thin film transistor layer 14 may form a liquid crystal panel 10 that displays an image. In other words, the liquid crystal panel 10 may include the color filter 20, the liquid crystal 12, and the thin film transistor layer 14.

The color filter 20 may be formed so that the display apparatus 1 displays a color image. When the light source of the backlight unit 40 is white, the color filter 20 may include a red filter, a green filter, and a blue filter. When the light source of the backlight unit 40 is blue, the color filter 20 may not include a blue filter. In this case, a portion corresponding to the blue filter of the color filter 20 may be formed as a transparent portion.

Figure 2:
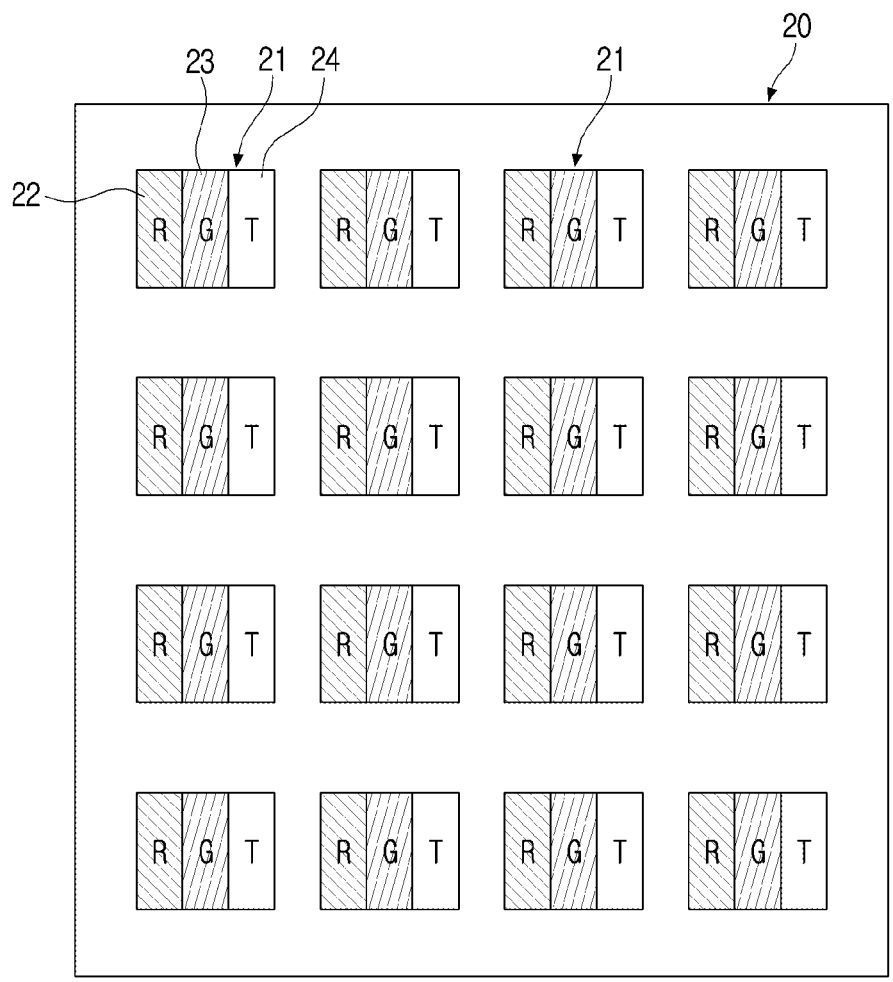
FIG. 2 is a view illustrating a color filter used in the display apparatus of FIG. 1.

FIG. 2 is a view illustrating a color filter used in the display apparatus of FIG. 1.

Referring to FIG. 2, the color filter 20 may include a plurality of color filter pixels 21. Each of the plurality of color filter pixels 21 may include three sub filter pixels 22, 23, and 24.

One color filter pixel 21 may include a red sub filter pixel 22, a green sub filter pixel 23, and a transparent sub filter pixel 24. In this case, a blue light source emitting blue light is used as the light source of the backlight unit 40.

The red sub filter pixel 22 may be formed to convert blue light emitted from the blue light source into red light. As an example, the red sub filter pixel 22 may be formed of quantum dots. Alternatively, the red sub filter pixel 22 may be formed of a fluorescent material.

The green sub filter pixel 23 may be formed to convert blue light emitted from the blue light source into green light. The green sub filter pixel 23 may be formed of quantum dots. Alternatively, the green sub filter pixel 23 may be formed of a fluorescent material.

The transparent sub filter pixel 24 may be formed to pass blue light emitted from the blue light source. As an example, the transparent sub filter pixel 24 may be formed of a glass plate forming the color filter 20.

As another example, when the light source of the backlight unit 40 is white, one color filter pixel 21 may include a red sub filter pixel, a green sub filter pixel, and a blue sub filter pixel.

The liquid crystal panel 10, that is, the color filter 20, the liquid crystal 12, and the thin film transistor layer 14 may be coupled to the backlight unit 40 with an upper chassis 30. The upper chassis 30 may be provided with an opening 30a through which the liquid crystal panel 10 is exposed.

An optical sheet 41 may be disposed between the liquid crystal panel 10 and the backlight unit 40. The optical sheet 41 may be formed to improve optical characteristics of light incident from the backlight unit 40 to the liquid crystal panel 10.

The backlight unit 40 may be formed to provide light to the liquid crystal 12. In other words, the backlight unit 40 may be formed to emit light toward the liquid crystal panel 10.

The backlight unit 40 may include at least two light sources 51 and 52 emitting light having different wavelengths. For example, the backlight unit 40 may include a first light source 51 emitting light of a first wavelength and a second light source 52 emitting light of a second wavelength. At this time, the first wavelength of the first light source 51 and the second wavelength of the second light source 52 are different from each other.

The first light source 51 and the second light source 52 may be formed of light emitting diodes (LEDs).

The first light source 51 may be formed to emit light having a central wavelength of 440 nm to 450 nm. For example, the first light source 51 may be formed of an LED emitting light having a central wavelength of 440 nm to 450 nm. The wavelength of 440 nm to 450 nm is blue, so that the first light source 51 is a blue light source. Accordingly, the first light source 51 may be formed of a blue LED emitting blue light.

The second light source 52 may be formed to emit light having a central wavelength of 475 nm to 505 nm. For example, the second light source 52 may be formed of an LED emitting light having a central wavelength of 475 nm to 505 nm. The wavelength of 475 nm to 505 nm is sky blue, so that the second light source 52 is a sky blue light source. In other words, the second light source 52 may be formed to emit sky blue light which is a right spectrum of blue light emitted from the first light source 51. Accordingly, the second light source 52 may be formed of a sky blue LED emitting sky blue light. When the user's retinal cells detect the blue light in the range of 440 nm to 450 nm emitted from the first light source 51, the human body may recognize the current state as night so as to secrete melatonin and suppress the secretion of serotonin.

A general display apparatus uses only a light source emitting blue light in the range of 440 nm to 450 nm. Therefore, when the display apparatus operates, blue light in the range of 440 nm to 450 nm is emitted, so that the human body may not distinguish between day and night. As a result, the general display apparatus may adversely affect the user's health, such as deteriorating the user's sleep quality.

When the user's retinal cells detect sky blue light in the range of 475 nm to 505 nm emitted from the second light source 52, the human body may recognize the current state as day so as to suppress the secretion of melatonin and secrete serotonin.

Figure 6:
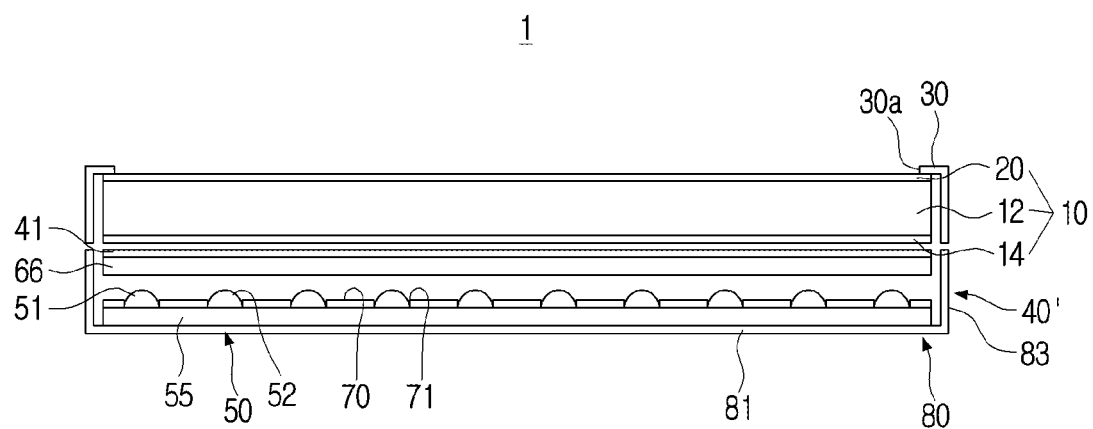
FIG. 6 is a cross-sectional view illustrating a display apparatus according to an example embodiment.

The backlight unit 40 may include an edge type backlight unit 40 and a direct type backlight unit 40' (e.g., see 40' in FIG. 6).

The display apparatus 1 according to the embodiment shown in FIG. 1 includes an edge type backlight unit 40. In the following description, for convenience of description, the edge type backlight unit is referred to as a backlight unit 40.

Referring to FIG. 1, the backlight unit 40 may include a light guide plate 60, a light source assembly 50 disposed on one side of the light guide plate 60, a reflective sheet 70 disposed below the light guide plate 60, and a lower chassis 80 disposed below the reflective sheet 70.

The light guide plate 60 may be formed to minimize or reduce the loss of light emitted from the light source assembly 50 disposed on one side surface 61 thereof to evenly distribute the light over the entire surface of the liquid crystal panel 10 and at the same time to focus the light in one direction. The light guide plate 60 is disposed below the liquid crystal panel 10, that is, below the liquid crystal 12.

The light guide plate 60 may be formed in a rectangular flat plate shape having a size corresponding to that of the liquid crystal panel 10 and may be formed of a transmissive material capable of transmitting light. For example, the light guide plate 60 may be formed of a transparent plastic such as polymethyl methacrylate PMMA, polycarbonate PC, and the like.

One side surface 61 of the light guide plate 60 is an incident surface on which light emitted from the light source assembly 50 is incident, and the upper surface 62 of the light guide plate 60 is a light exit surface through which light incident from the light source assembly 50 is emitted toward the liquid crystal panel 10. Accordingly, the light emitted from the light source assembly 50 is incident through one side surface 61 of the light guide plate 60 and then emitted to liquid crystal panel 10 through the upper surface 62 of the light guide plate 60.

The optical sheet 41 may be disposed on the upper surface 62 of the light guide plate 60. In other words, the optical sheet 41 may be disposed between the light guide plate 60 and the liquid crystal panel 10. The optical sheet 41 may minimize or reduce wasted light by using refraction and reflection of light, thereby improving the brightness of the light emitted through the light guide plate 60 and distributing the light evenly.

The optical sheet 41 may include a diffusion sheet that evenly diffuses light, a prism sheet that refracts light to improve luminance, a dual brightness enhancement film DBEF that selectively transmits and reflects light to improve brightness, and the like. The optical sheet 41 is the same as optical sheets used in general backlight units; therefore, a detailed description thereof is omitted. The light source assembly 50 may be formed to generate light supplied to the liquid crystal panel 10. The light source assembly 50 is disposed on one side of the light guide plate 60 in parallel with one side surface 61 of the light guide plate 60. In other words, the light source assembly 50 is disposed adjacent to and parallel to the incident surface of the light guide plate 60.

Figure 3:
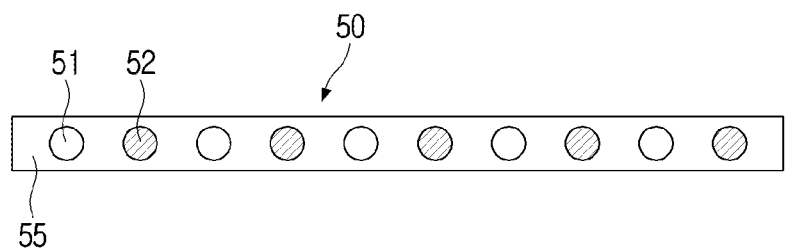
FIG. 3 is a view illustrating a light source assembly used in the display apparatus of FIG. 1.

FIG. 3 is a view illustrating a light source assembly used in the display apparatus of FIG. 1.

Referring to FIG. 3, the light source assembly 50 may be formed in a strip shape with a narrow width and a long length. The light source assembly 50 may include a first light source 51, a second light source 52, and a printed circuit board 55.

The first light source 51 may be formed to emit light having a central wavelength of 440 nm to 450 nm. For example, the first light source 51 may be formed of an LED emitting light having a central wavelength of 440 nm to 450 nm. The first light source 51 may include a plurality of blue LEDs emitting blue light having a wavelength of 440 nm to 450 nm.

The second light source 52 may be formed to emit light having a central wavelength of 475 nm to 505 nm. For example, the second light source 52 may be formed of an LED emitting light having a central wavelength of 475 nm to 505 nm. The second light source 52 may include a plurality of sky blue LEDs emitting sky blue light having a wavelength of 475 nm to 505 nm. The printed circuit board 55 is provided with a circuit for driving the first light source 51 and the second light source 52. For example, the printed circuit board 55 is provided with a circuit configured to drive a plurality of blue LEDs as the first light source 51 and a plurality of sky blue LEDs as the second light source 52. The printed circuit board 55 may be formed in a shape corresponding to one side surface 61 of the light guide plate 60. For example, the printed circuit board 55 may be formed in a strip shape with a narrow width and a long length. The first light source 51 and the second light source 52 may be disposed in a line on one surface of the printed circuit board 55.

Referring to FIG. 3, the first light source 51 and the second light source 52 are alternately arranged on the printed circuit board 55. For example, the plurality of blue LEDs forming the first light source 51 and the plurality of sky blue LEDs forming the second light source 52 are alternately arranged on the printed circuit board 55 in a straight line. In other words, a blue LED, a sky blue LED, a blue LED, and a sky blue LED may be arranged in this order.

The first light source 51 and the second light source 52 may be arranged one-to-one. In other words, the plurality of blue LEDs and the plurality of sky blue LEDs may be arranged one-to-one on the printed circuit board 55. Therefore, the plurality of blue LEDs and the plurality of sky blue LEDs may be disposed on the printed circuit board 55 in the same number.

As another example, the number of blue LEDs forming the first light source 51 and the number of sky blue LEDs forming the second light source 52 may be different.

The number of the plurality of blue LEDs is determined so that when the second light source 52 is turned off, only the first light source 51 supplies enough light to the liquid crystal panel 10 so that the display apparatus 1 may display an image normally.

The number of the plurality of sky blue LEDs may be determined so that the human body detects the wavelength of sky blue light to suppress the secretion of melatonin and secrete serotonin when the plurality of sky blue LEDs are turned on. In addition, the number of the plurality of sky blue LEDs may be determined so that the plurality of sky blue LEDs supply enough light to the liquid crystal panel 10 so that the display apparatus 1 displays an image normally when the sky blue LEDs are turned on together with the plurality of blue LEDs.

The reflective sheet 70 reflects the light escaping from the lower surface of the light guide plate 60 toward the light guide plate 60 again. The light reflected by reflective sheet 70 passes through the light guide plate 60 and moves to the liquid crystal panel 10.

The lower chassis 80 may be formed to support the light source assembly 50, the light guide plate 60, and the reflective sheet 70. The reflective sheet 70 is disposed on the upper surface of the bottom 81 of the lower chassis 80, and the light guide plate 60 is disposed on the upper surface of the reflective sheet 70. A side wall 83 is provided at an edge of the bottom 81 of the lower chassis 80 and extends vertically upward. The light source assembly 50 may be supported by the side wall 83 of the lower chassis 80.

The lower chassis 80 may be coupled to the upper chassis 30. When the upper chassis 30 is coupled to the upper side of the lower chassis 80, the liquid crystal panel 10 is fixed to the upper side of the backlight unit 40.

Figure 4:
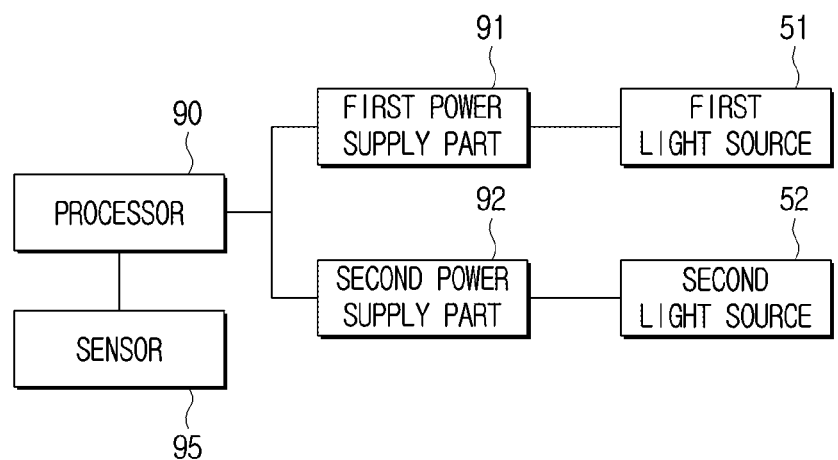
FIG. 4 is a block diagram illustrating a relationship between a processor and first and second light sources of the display apparatus of FIG. 1.

The display apparatus 1 may include a first power supply part 91 that supplies power to the first light source 51, a second power supply part 92 that supplies power to the second light source 52, and a processor 90 configured to control the first power supply part 91 and the second power supply part 92 (e.g., see 91 and 92 in FIG. 4). Each of the power supply parts 91 and 92 may comprise circuitry.

FIG. 4 is a block diagram illustrating a relationship between a processor and first and second light sources of the display apparatus of FIG. 1. The first power supply part 91 may be formed to supply current to the first light source 51. In addition, the first power supply part 91 may be formed to adjust the intensity of current being supplied to the first light source 51. In other words, the first power supply part 91 is configured to supply current to the plurality of blue LEDs and to adjust the intensity of the supplied current. When the maximum or large current is supplied to the first light source 51, that is, the plurality of blue LEDs by the first power supply part 91, the plurality of blue LEDs may emit blue light to the maximum or to a large extent.

In addition, when only the first light source 51 is turned on while the second light source 52 is turned off, the first power supply part 91 supplies the maximum or large current to the first light source 51 so that the display apparatus 1 may display an image normally.

The second power supply part 92 may be formed to supply current to the second light source 52. In addition, the second power supply part 92 may be formed to adjust the intensity of current being supplied to the second light source 52. In other words, the second power supply part 92 is configured to supply current to the plurality of sky blue LEDs and to adjust the intensity of the supplied current. When the maximum or large current is supplied to the second light source 52, that is, the plurality of sky blue LEDs by the second power supply part 92, the plurality of sky blue LEDs may emit sky blue light to the maximum or to a large extent.

When the plurality of sky blue LEDs emit sky blue light to the maximum or a large extent, the human body may effectively perform a mechanism of suppressing melatonin secretion and secreting serotonin. The first power supply part 91 and the second power supply part 92 may be formed separately. In other words, the first power supply part 91 may be formed not to supply current to the second light source 52, and the second power supply part 92 may be formed not to supply current to the first light source 51. When the first power supply part 91 and the second power supply part 92 are separated from each other, currents being supplied to the first light source 51 and the second light source 52 may be separately controlled. Accordingly, it is possible to prevent or reduce overcurrent from flowing through the first light source 51 and the second light source 52.

Figure 5:
FIG. 5 is a view illustrating a pin arrangement of a power connector of a power board of the display apparatus of FIG. 1.

For example, as illustrated in FIG. 5, the first power supply part 91 and the second power supply part 92 may be connected, directly or indirectly, to different pins of a power connector 99 of a power board.

FIG. 5 is a view illustrating a pin arrangement of a power connector of a power board of the display apparatus of FIG. 1. For reference, in FIG. 5, No represents a pin number.

Referring to FIG. 5, the first power supply part 91 may be connected, directly or indirectly, to pins 1 and 4, and pins 2 and 5 of the power connector 99. The second power supply part 92 may be connected, directly or indirectly, to pins 7 and 10, and pins 8 and 11 of the power connector 99. Because pins 1 to 12 of the power connector 99 are all separated, power may be separately supplied to the first power supply part 91 and the second power supply part 92. Although not illustrated, the first power supply part 91 and the second power supply part 92 may receive power from an external power supply connected, directly or indirectly, to the display apparatus 1.

The processor 90 may be configured to control the first power supply part 91 and the second power supply part 92 to supply current to the first light source 51 and the second light source 52. The processor 90 may control the first power supply part 91 and the second power supply part 92 so that the first power supply part 91 and the second power supply part 92 simultaneously supply current to the first light source 51 and the second light source 52.

The processor 90 may control the first power supply part 91 and the second power supply part 92 so that intensity of a first current supplied to the first light source 51 is different from intensity of a second current supplied to the second light source 52. For example, the processor 90 may control the first power supply part 91 and the second power supply part 92 to supply a maximum or large current to the second light source 52 and a current less than the maximum or large current to the first light source 51.

The processor 90 may recognize sunrise and sunset using signals input from a sensor 95. An illuminance sensor capable of sensing external illuminance may be used as the sensor 95.

Alternatively, the processor 90 may recognize sunrise and sunset using time. The processor 90 may be configured to recognize time. The user may set a sunrise time and a sunset time using a time setting part. Thus, the processor 90 may recognize sunrise and sunset using the set sunrise and sunset times and the current time.

The processor 90 may be implemented as a main processor that controls overall operations of the display apparatus 1. In other words, the processor 90 may be a part of the main processor that controls the operation of the display apparatus 1.

The processor 90 may be composed of one processor or a plurality of processors. In detail, the processor 90 may perform the operation of the display apparatus 1 according to an example embodiment by executing at least one instruction stored in a memory.

The processor 90 according to an embodiment may be implemented with at least one of a digital signal processor (DSP), a microprocessor, a graphics-processing unit (GPU), an artificial intelligence (AI) processor, a neural processing unit (NPU), and a time controller (TCON) for processing digital image signals. However, the processor 90 is not limited thereto, and may include at least one of a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. In addition, the processor 90 may be implemented as a system on chip (SoC) or a large scale integration (LSI) in which a processing algorithm is built therein, or may be implemented as an application specific integrated circuit (ASIC) type or a field programmable gate array (FPGA) type. In the case of sky blue light having a wavelength of 475 nm to 505 nm, the brightness is much lower than that of blue light having a wavelength of 440 nm to 450 nm. In order to provide a specific effect of sky blue light, the brightness of sky blue light may be brighter than that of blue light. In other words, the intensity of light emitted from the plurality of sky blue LEDs may be stronger than the intensity of light emitted from the plurality of blue LEDs. When the intensity of sky blue light is stronger than that of blue light, the human body may effectively suppress the secretion of melatonin and secrete serotonin. It may be considered to turn off the blue LEDs, that is, the first light source 51 in order to reveal the effect of the sky blue light. However, when only the plurality of sky blue LEDs are operated, the image quality and brightness of the display apparatus 1 are lower than when only the plurality of blue LEDs are operated.

For example, when only the plurality of sky blue LEDs are operated, the green color of the image displayed on the display apparatus 1 becomes stronger, and thus the harmony of red, green, and blue colors of the image may be broken.

Therefore, in order to maintain the image quality and brightness of the display apparatus 1, the display apparatus 1 according to an example embodiment may simultaneously operate the plurality of blue LEDs, that is, the first light source 51 when operating the plurality of sky blue LEDs, that is, the second light source 52. At this time, the first light source 51 may be operated with a lower current than the second light source 52 that operates with the maximum or large current to correct the image quality and brightness of the display apparatus 1.

With the display apparatus 1 according to an example embodiment having the above-described structure, because the display apparatus 1 emits sky blue light, the human body may suppress the secretion of melatonin and secrete serotonin. Therefore, the display apparatus 1 may have a good effect on the human body.

In addition, with the display apparatus 1 according to an example embodiment, because the plurality of blue LEDs and the plurality of sky blue LEDs operate simultaneously, the quality and brightness of a displayed image may be improved.

Hereinafter, a display apparatus 1 including a direct type backlight unit 40' according to an example embodiment will be described in detail with reference to FIG. 6.

FIG. 6 is a cross-sectional view illustrating a display apparatus according to an example embodiment.

Referring to FIG. 6, a display apparatus 1 according to an example embodiment may include a liquid crystal 12, a color filter 20, and a backlight unit 40'.

The liquid crystal 12 is configured to display an image and may include a plurality of thin film transistors. The plurality of thin film transistors may be formed as a thin film transistor layer 14. The thin film transistor layer 14 may be formed in a shape and size corresponding to that of the liquid crystal 12. The color filter 20 may be disposed to overlap the liquid crystal 12. The color filter 20 may be disposed on the front or rear side of the liquid crystal 12. The color filter 20 may be formed in a shape and size corresponding to that of the liquid crystal 12. The color filter 20 may be formed in a thin film shape.

The liquid crystal 12 may be accommodated between the thin film transistor layer 14 and the color filter 20. In the case of the embodiment shown in FIG. 6, the color filter 20 is disposed on the upper side of the liquid crystal 12, and the thin film transistor layer 14 is disposed on the lower side of the liquid crystal 12. However, the arrangement of the color filter 20 and the thin film transistor layer 14 is not limited thereto.

Alternatively, the thin film transistor layer 14 may be disposed on the upper side of the liquid crystal 12 and the color filter 20 may be disposed on the lower side of the liquid crystal 12.

The color filter 20, the liquid crystal 12, and the thin film transistor layer 14 may form a liquid crystal panel 10 that displays an image. In other words, the liquid crystal panel 10 may include the color filter 20, the liquid crystal 12, and the thin film transistor layer 14.

The color filter 20 may be formed so that the display apparatus 1 displays a color image. The color filter 20 is the same as the color filter 20 of the display apparatus 1 according to the above-described embodiment; therefore, a detailed description thereof is omitted.

The liquid crystal panel 10, that is, the color filter 20, the liquid crystal 12, and the thin film transistor layer 14 may be coupled to the backlight unit 40' with an upper chassis 30. The upper chassis 30 may be provided with an opening 30*a* through which the liquid crystal panel 10 is exposed.

An optical sheet 41 may be formed to improve optical characteristics of light incident from the backlight unit 40' to the liquid crystal panel 10. The optical sheet 41 may be disposed between the liquid crystal panel 10 and the backlight unit 40'.

The backlight unit 40' may be formed to provide light to the liquid crystal 12. In other words, the backlight unit 40' may be formed to emit light toward the liquid crystal panel 10.

The backlight unit 40' may include at least two light sources emitting light having different wavelengths. For example, the backlight unit 40' may include a first light source 51 emitting light of a first wavelength and a second light source 52 emitting light of a second wavelength. At this time, the first wavelength of the first light source 51 and the second wavelength of the second light source 52 are different from each other.

The first light source 51 and the second light source 52 may be formed of light emitting diodes (LEDs).

The first light source 51 may be formed to emit light having a central wavelength of 440 nm to 450 nm. For example, the first light source 51 may be formed of an LED emitting light having a central wavelength of 440 nm to 450 nm. The wavelength of 440 nm to 450 nm is blue, so that the first light source 51 may be formed of a blue LED emitting blue light.

The second light source 52 may be formed to emit light having a central wavelength of 475 nm to 505 nm. For example, the second light source 52 may be formed of an LED emitting light having a central wavelength of 475 nm to 505 nm. The wavelength of 475 nm to 505 nm is sky blue, so that the second light source 52 may be formed of a sky blue LED emitting sky blue light. In other words, the second light source 52 may be formed to emit sky blue light, which is a right spectrum of blue light emitted from the first light source 51.

When the user's retinal cells detect the blue light in the range of 440 nm to 450 nm emitted from the first light source 51, the human body may recognize the current state as night so as to secrete melatonin and suppress the secretion of serotonin.

When the user's retinal cells detect sky blue light in the range of 475 nm to 505 nm emitted from the second light source 52, the human body may recognize the current state as day so as to suppress the secretion of melatonin and secrete serotonin.

The display apparatus 1 according to the embodiment illustrated in FIG. 6 includes a direct type backlight unit 40'. In the following description, for convenience of description, the direct type backlight unit 40' is referred to as the backlight unit 40'.

Referring to FIG. 6, the backlight unit 40' may include a diffusion plate 66, a light source assembly 50 disposed below the diffusion plate 66, and a lower chassis 80 disposed below the light source assembly 50.

The diffusion plate 66 may be formed to minimize or reduce the loss of light emitted from the first light source 51 and the second light source 52 disposed below the diffusion plate 66 to evenly distribute the light over the entire surface of the liquid crystal panel 10, and at the same time to focus the light in one direction.

The diffusion plate 66 may be formed in a rectangular flat plate shape having a size corresponding to that of the liquid crystal panel 10 and may be formed of a transmissive material capable of transmitting light. For example, the diffusion plate 66 may be formed of a transparent plastic such as polymethyl methacrylate PMMA, polycarbonate PC, and the like.

The lower surface of the diffusion plate 66 serves as an incident surface on which light emitted from the light source assembly 50 is incident, and the upper surface of the diffusion plate 66 serves as a light exit surface through which the light incident from the light source assembly 50 is emitted toward the liquid crystal panel 10. Accordingly, the light emitted from the light source assembly 50 is incident through the lower surface of the diffusion plate 66, passes through the diffusion plate 66, and then is emitted to the liquid crystal panel 10 through the upper surface of the diffusion plate 66.

The optical sheet 41 may be disposed on the upper surface of the diffusion plate 66, that is, between the diffusion plate 66 and the liquid crystal panel 10. The optical sheet 41 may minimize or reduce wasted light by using refraction and reflection of light, thereby improving the brightness of the light emitted through the diffusion plate 66 and distributing the light evenly. The optical sheet 41 may include a prism sheet that refracts light to improve luminance, a dual brightness enhancement film DBEF that selectively transmits and reflects light to improve brightness, and the like. The optical sheet 41 is the same as or similar to optical sheets used in general display apparatuses; therefore, a detailed description thereof is omitted.

The plurality of blue LEDs forming the first light source 51 and the plurality of sky blue LEDs forming the second light source 52 may be disposed below the diffusion plate 66 in a planar shape. In this case, the plurality of blue LEDs and the plurality of sky blue LEDs may be alternately arranged on a plane below the diffusion plate 66.

Figure 7:
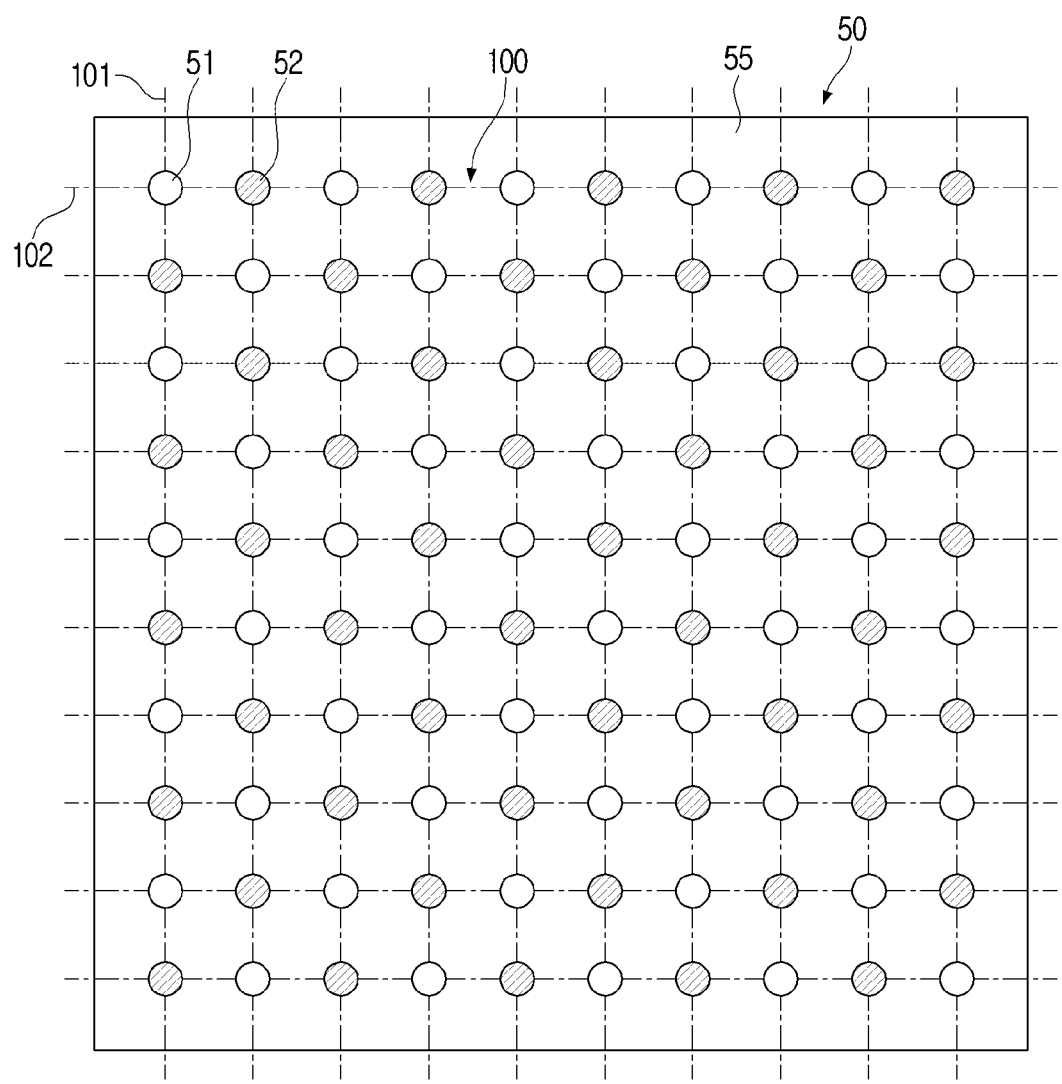
FIG. 7 is a view illustrating a light source assembly used in the display apparatus of FIG. 6.

The light source assembly 50 may be formed to generate light supplied to the liquid crystal panel 10. The light source assembly 50 is disposed under the diffusion plate 66. In other words, the light source assembly 50 is disposed on the bottom 81 of the lower chassis 80 below the diffusion plate 66. FIG. 7 is a view illustrating a light source assembly used in the display apparatus of FIG. 6.

Referring to FIG. 7, the light source assembly 50 may be formed in a rectangular shape. The light source assembly 50 may include the first light source 51, the second light source 52, and the printed circuit board 55.

The first light source 51 may be formed to emit light having a central wavelength of 440 nm to 450 nm. For example, the first light source 51 may be formed of an LED emitting light having a central wavelength of 440 nm to 450 nm. The first light source 51 may include a plurality of blue LEDs emitting blue light having a wavelength of 440 nm to 450 nm.

The second light source 52 may be formed to emit light having a central wavelength of 475 nm to 505 nm. For example, the second light source 52 may be formed of an LED emitting light having a central wavelength of 475 nm to 505 nm. The second light source 52 may include a plurality of sky blue LEDs emitting sky blue light having a wavelength of 475 nm to 505 nm. The printed circuit board 55 is provided with a circuit for driving the first light source 51 and the second light source 52. For example, the printed circuit board 55 is provided with a circuit configured to drive the plurality of blue LEDs as the first light source 51 and the plurality of sky blue LEDs as the second light source 52. The printed circuit board 55 may be formed in a shape corresponding to the diffusion plate 66. For example, the printed circuit board 55 may be formed in a rectangular flat plate corresponding to the diffusion plate 66. The first light source 51 and the second light source 52 are disposed at regular intervals on the upper surface of the printed circuit board 55 as illustrated in FIG. 7 to uniformly supply light to the diffusion plate 66. The first light source 51 and the second light source 52 may be alternately disposed on the printed circuit board 55.

Referring to FIG. 7, the plurality of blue LEDs forming the first light source 51 and the plurality of sky blue LEDs forming the second light source 52 are alternately arranged on the printed circuit board 55 in a straight line. For example, the plurality of blue LEDs as the first light source 51 and the plurality of sky blue LEDs as the second light source 52 may be alternately arranged at intersections of a virtual grid pattern 100 formed of a plurality of virtual vertical lines 101 and a plurality of virtual horizontal lines 102 on the printed circuit board 55.

Accordingly, the plurality of blue LEDs as the first light source 51 and the plurality of sky blue LEDs as the second light source 52 are arranged in a straight line on the virtual vertical line 101. At this time, the plurality of blue LEDs and the plurality of sky blue LEDs are alternately arranged on the virtual vertical line 101.

In addition, the plurality of blue LEDs as the first light source 51 and the plurality of sky blue LEDs as the second light source 52 are arranged in a straight line on the virtual horizontal line 102. At this time, the plurality of blue LEDs and the plurality of sky blue LEDs are alternately arranged on the virtual horizontal line 102.

The first light source 51 and the second light source 52 may be arranged one-to-one. In other words, the plurality of blue LEDs as the first light source 51 and the plurality of sky blue LEDs as the second light source 52 may be arranged one-to-one on the printed circuit board 55. Therefore, the plurality of blue LEDs and the plurality of sky blue LEDs may be disposed on the printed circuit board 55 in the same number.

Alternatively, the number of the plurality of blue LEDs forming the first light source 51 and the number of the plurality of sky blue LEDs forming the second light source 52 may be different.

The number of the plurality of blue LEDs as the first light source 51 is determined so that when the second light source 52 is turned off, only the first light source 51 supplies enough light to the liquid crystal panel 10 so that the display apparatus 1 may display an image normally.

The number of the plurality of sky blue LEDs as the second light source 52 may be determined so that when the plurality of sky blue LEDs are turned on, the human body detects the wavelength of sky blue light to perform a mechanism of suppressing the secretion of melatonin and secreting serotonin. However, the arrangement of the plurality of blue LEDs and the plurality of sky blue LEDs is not limited thereto. The plurality of blue LEDs and the plurality of sky blue LEDs may be arranged in various patterns as long as they can perform their functions.

The reflective sheet 70 is disposed on the upper surface of the printed circuit board 55. In detail, the reflective sheet 70 includes a plurality of holes 71 through which the first light source 51 and the second light source 52 protrude. When the reflective sheet 70 is disposed on the upper surface of the printed circuit board 55, the first light source 51 and the second light source 52 protrude above the reflective sheet 70 through the plurality of holes 71. The reflective sheet 70 reflects some of the light emitted from the light source assembly 50 and the light reflected by the optical sheet 41 and escaping from the lower surface of the diffusion plate 66 toward the diffusion plate 66 again. The light reflected by reflective sheet 70 passes through the diffusion plate 66 and travels to the liquid crystal panel 10.

The reflective sheet 70 may be formed in a rectangular thin film shape corresponding to the diffusion plate 66. The reflective sheet 70 may be formed of white opaque plastic to reflect light emitted from the lower surface 21 of the diffusion plate 66. For example, the reflective sheet 70 may be of any one of polyester terephthalate PET, polycarbonate PC, and polyester.

The lower chassis 80 may be formed to accommodate and support the diffusion plate 66, the light source assembly 50, and the reflective sheet 70. The light source assembly 50 is disposed on the upper surface of the bottom 81 of the lower chassis 80. The reflective sheet 70 is disposed on the upper surface of the light source assembly 50. A side wall 83 is provided at an edge of the bottom 81 of the lower chassis 80 and extends vertically upward.

A plurality of supports for supporting the diffusion plate 66 may be disposed between the printed circuit board 55 and the diffusion plate 66.

The display apparatus 1 may include a first power supply part 91 that supplies power to the first light source 51, a second power supply part 92 that supplies power to the second light source 52, and a processor 90 configured to control the first power supply part 91 and the second power supply part 92. The first power supply part 91, the second power supply part 92, and the processor 90 are the same as those of the display apparatus 1 according to the above-described embodiment; therefore, detailed descriptions thereof are omitted.

Hereinafter, an operation of the display apparatus according to an example embodiment will be described with reference to FIG. 8.

Figure 8:
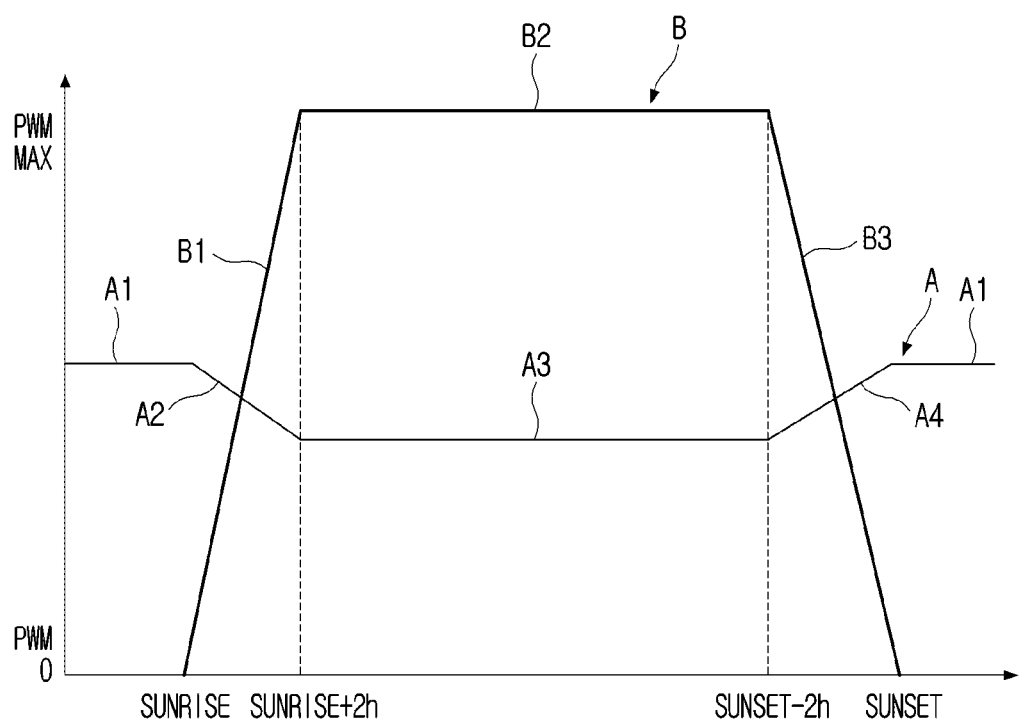
FIG. 8 is a graph illustrating operations of a first light source and a second light source of a display apparatus according to an example embodiment.

FIG. 8 is a graph illustrating operations of a first light source and a second light source of a display apparatus according to an example embodiment. For reference, in FIG. 8, the horizontal axis represents time, and the vertical axis represents amplitude of a pulse width modulation (PWM) signal.

A is line representing the change of the pulse width modulation signal that controls current supplied to the first light source 51 over time, and B is a line representing the change of the pulse width modulation signal that controls current supplied to the second light source 52 over time.

When the amplitude of the pulse width modulation signal controlling the light source is maximum (PWM MAX), the intensity of the current supplied to the light source (the amount of current supplied during the reference time) is maximized so that the light source may emit light with the maximum intensity. When the pulse width modulation signal is zero (0) (PWM 0), no current is supplied to the light source. In other words, the light source is off. When the amplitude of the pulse width modulation signal increases, the intensity of the current supplied to the light source increases proportionally.

Referring to FIG. 8, at night (from sunset to sunrise), only the first light source 51 is turned on, and the second light source 52 is turned off. In other words, the processor 90 controls the first power supply part 91 and the second power supply part 92 to turn on the first light source 51 and turn off the second light source 52. At this time, as illustrated by A1 in FIG. 8, the processor 90 does not control the first light source 51 with a pulse width modulation signal having a maximum amplitude, but controls the first light source 51 with a pulse width modulation signal having a substantially medium or larger amplitude. When the first light source 51 is controlled with a pulse width modulation signal having a substantially medium or larger amplitude, a current having a substantially medium intensity is supplied to the first light source 51. When the current having a substantially medium intensity is supplied to the first light source 51, the display apparatus 1 may display an appropriate image at night, and the human body may effectively secrete melatonin.

When the sun rises, the processor 90 controls the second power supply part 92 to supply current to the second light source 52. At this time, the processor 90 gradually increases the amplitude of the pulse width modulation signal that controls the second light source 52 so that the current supplied to the second light source 52 gradually increases. For example, as shown by B1 in FIG. 8, the processor 90 may control the second power supply part 92 so that the maximum current is supplied to the second light source 52 after a predetermined time elapse from sunrise.

In this embodiment, the processor 90 is configured to control the second power supply part 92 so that the maximum current is supplied to the second light source 52 when two hours elapse from sunrise. However, the time taken until the maximum current is supplied to the second light source 52 is not limited thereto. This time may be appropriately adjusted as needed. At the same time, the processor 90 gradually reduces the amplitude of the pulse width modulation signal that controls the first light source 51 so that the current supplied to the first light source 51 gradually decreases. For example, as illustrated by A2 in FIG. 8, the processor 90 may control the first power supply part 91 so that the current supplied to the first light source 51 decreases after a predetermined time elapses from sunrise.

During the day, the processor 90 maximizes the amplitude of the pulse width modulation signal that controls the second light source 52 so that the maximum current is supplied to the second light source 52 (see B2). At this time, the processor 90 controls the current supplied to the first light source 51 during the day to be smaller than the current supplied to the first light source 51 at night. Then, the blue light emitted from the first light source 51 complements the sky blue light emitted from the second light source 52 so that the display apparatus 1 may display an image of appropriate quality and brightness. For example, the processor 90 may adjust the intensity of the current supplied to the first light source 51 by adjusting the amplitude of the pulse width modulation signal that controls the first light source 51. That is, the processor 90 maintains the amplitude of the pulse width modulation signal controlling the first light source 51 at A3, which is lower than A1 at night.

In other words, during the day, the second light source 52 operates with a pulse width modulation signal having the maximum amplitude so as to receive the maximum current, and the first light source 51 operates with a pulse width modulation signal having an amplitude approximately lower than the medium level so as to receive a current that is approximately lower than the medium level.

As described above, in the display apparatus 1 according to an example embodiment, the first light source 51 and the second light source 52 are simultaneously turned on during the day to simultaneously emit light having a wavelength of 440 nm to 450 nm and light having a wavelength of 475 nm to 505 nm to the user. Thus, the human body may suppress the secretion of melatonin and secrete serotonin.

When the sun goes down, the processor 90 controls the second power supply part 92 to cut off the current supplied to the second light source 52. At this time, the processor 90 gradually reduces the amplitude of the pulse width modulation signal that controls the second light source 52 so that the current supplied to the second light source 52 gradually decreases. For example, as illustrated by B3 in FIG. 8, the processor 90 gradually reduces the current supplied to the second light source 52 from a predetermined time before sunset so that the second light source 52 is turned off at sunset.

In this embodiment, the processor 90 is configured to reduce the current supplied to the second light source 52 from two hours before sunset. However, the time taken for the current supplied to the second light source 52 to change from the maximum current to zero is not limited thereto. This time may be appropriately adjusted as needed.

At this time, the processor 90 gradually increases the amplitude of the pulse width modulation signal that controls the first light source 51 so that the current supplied to the first light source 51 gradually increases (see A4). When the current supplied to the first light source 51 is equal to A1, the processor 90 maintains the amplitude of the pulse width modulation signal controlling the first light source 51 as it is.

In the display apparatus 1 according to an example embodiment having the above structure, the second light source 52 emits sky blue light so that the human body suppresses the secretion of melatonin and secretes serotonin, thereby having a good effect to the human body. Therefore, the display apparatus 1 according to an example embodiment may operate in harmony with human biorhythms.

In addition, in the display apparatus 1 according to an example embodiment, because the plurality of blue LEDs and the plurality of sky blue LEDs operate simultaneously, the quality and brightness of a displayed image may be improved compared to the case of displaying an image using only a plurality of sky blue LEDs.

A general display apparatus does not include the second light source 52 capable of helping secretion of serotonin and suppressing secretion of melatonin. Accordingly, the light source of the general display apparatus is controlled with a pulse width modulation signal having a maximum amplitude as illustrated in FIG. 9.

Figure 9:
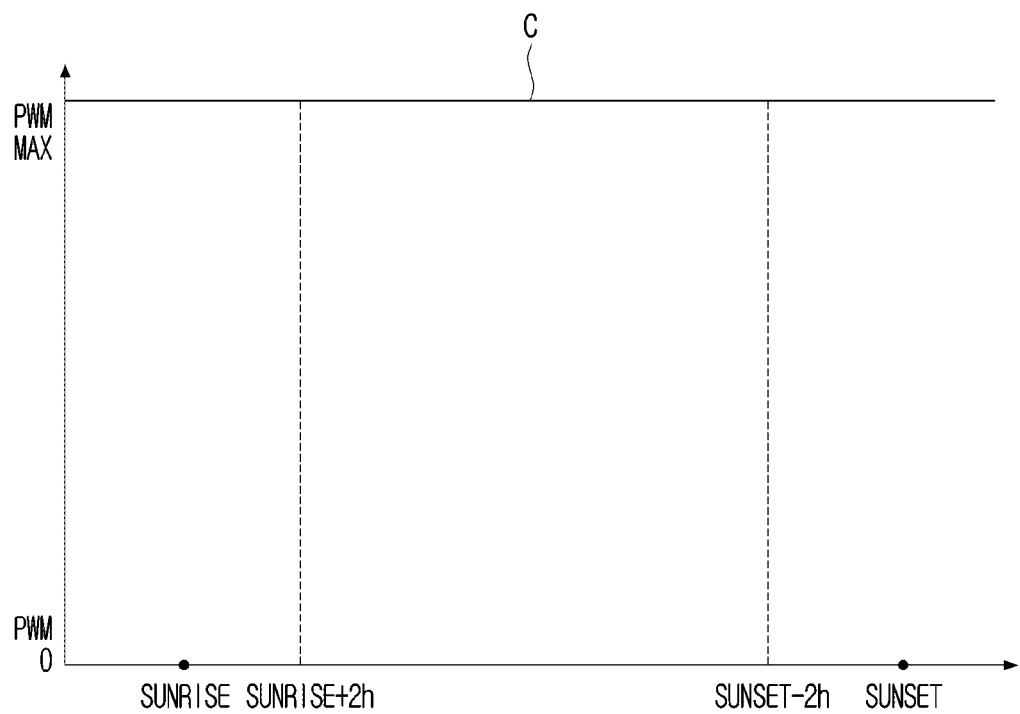
FIG. 9 is a graph illustrating the operation of a light source of a general display apparatus.

FIG. 9 is a graph illustrating operation of a light source of a general display apparatus. For reference, in FIG. 9, the horizontal axis represents time, and the vertical axis represents amplitude of the pulse width modulation signal. C is a line representing the change of the pulse width modulation signal that controls the current supplied to the light source over time.

Referring to FIG. 9, it can be seen that the light source of the general display apparatus is controlled with a pulse width modulation signal having a maximum amplitude throughout 24 hours.

Therefore, the general display apparatus does not emit sky blue light, so that the general display apparatus cannot cause the human body to suppress the secretion of melatonin and secrete serotonin. Accordingly, the general display apparatus does not operate harmoniously with human biorhythms, thereby adversely affecting the human body.

Figure 10:
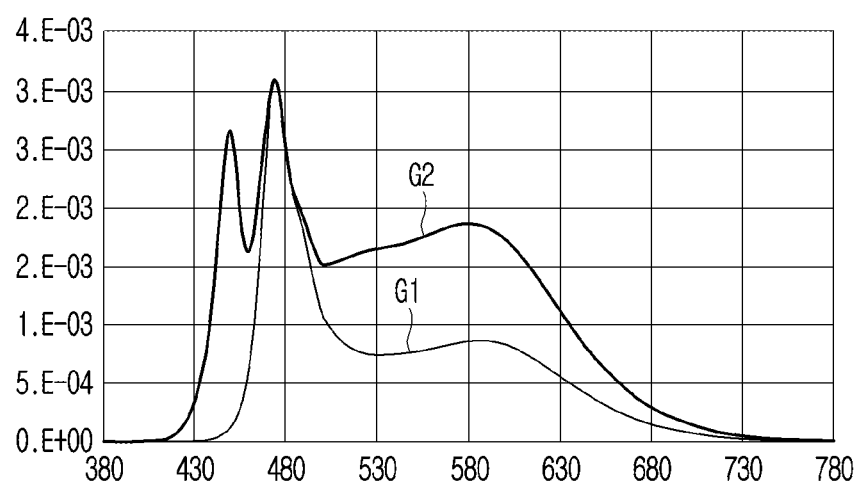

FIG. 10 is a graph illustrating light intensity when both a first light source and a second light source of a display apparatus according to an example embodiment are turned on and light intensity when only the first light source thereof is turned on.

For reference, in FIG. 10, the horizontal axis represents the wavelength, and the unit is nm. The vertical axis represents the intensity of light, and the unit is candela (cd). G1 represents a state in which only the second light source 52 is turned on and the first light source 51 is turned off. G2 represents a state in which both the first light source 51 and the second light source 52 are turned on.

Referring to G1 in FIG. 10, when only the second light source 52 is turned on, the intensity of light having a wavelength of about 480 nm is the largest, and the intensity of light having other wavelengths is all small. Referring to G2, when both the first light source 51 and the second light source 52 are turned on, the intensity of light having a wavelength of about 480 nm is the greatest, and the intensity of light having a wavelength of about 440 nm is slightly smaller than the intensity of light having the wavelength of 480 nm. Accordingly, it can be seen that when both the first light source 51 and the second light source 52 are turned on, the light emitted from the first light source 51 and the light emitted from the second light source 52 do not interfere with each other.

Figure 11:
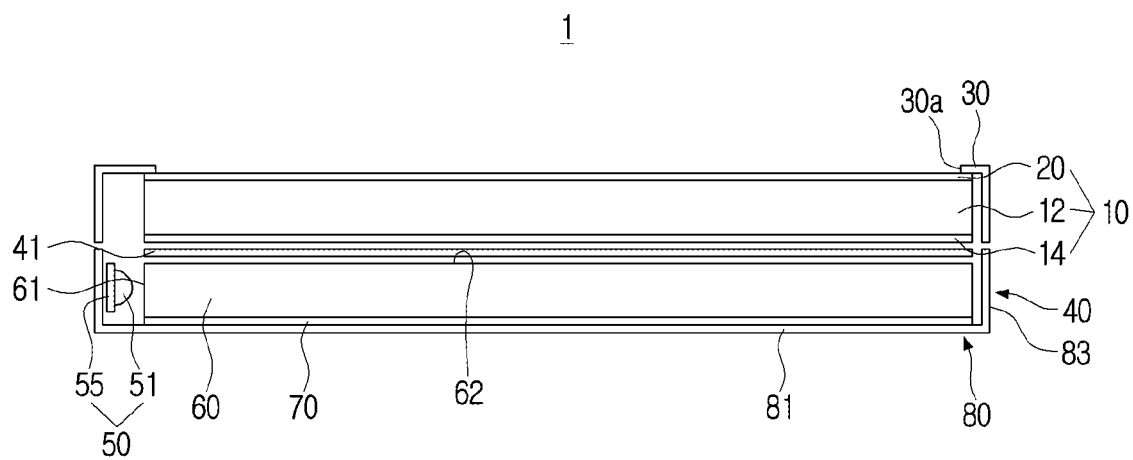
FIG. 11 is a cross-sectional view illustrating a display apparatus according to an example embodiment.

In the above description, the sky blue LEDs emitting sky blue light with the wavelength of 475 nm to 505 nm that suppresses the secretion of melatonin and promotes the secretion of serotonin are used as the second light source 52. However, the second light source 52 is not limited thereto. As the second light source 52, LEDs emitting light having a wavelength having a different effect may be used. Hereinafter, a display apparatus 1 according to an example embodiment using LEDs having different efficiencies as the second light source 52 will be described in detail with reference to FIGS. 11 to 16. FIG. 11 is a cross-sectional view illustrating a display apparatus according to an example embodiment.

Referring to FIG. 11, a display apparatus 1 according to an example embodiment may include a liquid crystal panel 10 and a backlight unit 40 comprising a backlight.

The liquid crystal panel 10 includes a color filter 20, a thin film transistor layer 14, and a liquid crystal 12 provided between the color filter 20 and the thin film transistor layer 14. The liquid crystal panel 10 is the same as that of the display apparatus 1 according to the above-described embodiment; therefore, a detailed description thereof is omitted.

The backlight unit 40 may be formed as an edge type backlight unit 40. The backlight unit 40 may include a light guide plate 60, a light source assembly 50 disposed on one side of the light guide plate 60, a reflective sheet 70 disposed below the light guide plate 60, and a lower chassis 80 disposed below the reflective sheet 70.

The light guide plate 60, the reflective sheet 70, and the lower chassis 80 are the same as the edge type backlight unit 40 of the display apparatus 1 according to the above-described embodiment; therefore, detailed descriptions thereof are omitted. Hereinafter, the light source assembly 50 different from that of the display apparatus 1 according to the above-described embodiment will be described.

Figure 12:
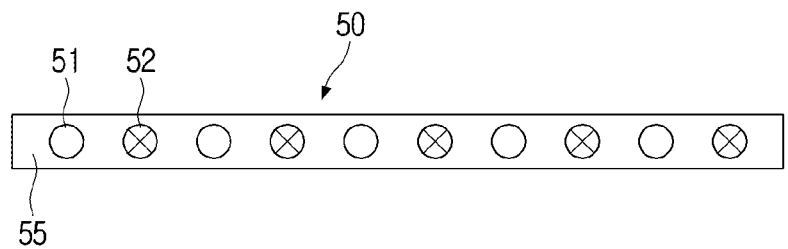
FIG. 12 is a view illustrating a light source assembly used in the display apparatus of FIG. 11.

FIG. 12 is a view illustrating a light source assembly used in the display apparatus of FIG. 11.

Referring to FIG. 12, the light source assembly 50 may be formed in a strip shape with a narrow width and a long length. The light source assembly 50 may include a first light source 51, a second light source 52, and a printed circuit board 55.

The first light source 51 may be formed to emit light having a central wavelength of 440 nm to 450 nm. For example, the first light source 51 may be formed of an LED emitting light having a central wavelength of 440 nm to 450 nm. The first light source 51 may include a plurality of blue LEDs emitting blue light having a wavelength of 440 nm to 450 nm.

The second light source 52 may be formed to emit light of a wavelength helpful for cell regeneration. For example, the second light source 52 may be formed as a light source that emits light having a wavelength of 600 nm to 1000 nm. In other words, the second light source 52 may be formed of an LED emitting light having a wavelength of 600 nm to 1000 nm.

For example, the second light source 52 may be formed of an LED that emits light having any one of wavelengths of 620 nm, 680 nm, 780 nm, and 850 nm. Light having such a wavelength is known to be effective in hair loss, skin regeneration, vision regeneration, and the like. Light at these wavelengths may stimulate cellular mitochondrial enzymes to aid in ATP cell synthesis.

Hereinafter, for convenience of description, if necessary, an LED emitting light having a wavelength of 600 nm to 1000 nm is referred to as a cell regeneration LED.

The printed circuit board 55 is provided with a circuit for driving the first light source 51 and the second light source 52. For example, the printed circuit board 55 is provided with a circuit configured to drive a plurality of blue LEDs as the first light source 51 and a plurality of cell regeneration LEDs as the second light source 52. The printed circuit board 55 is formed in a shape corresponding to one side surface 61 of the light guide plate 60. For example, the printed circuit board 55 may be formed in a strip shape with a narrow width and a long length.

The first light source 51 and the second light source 52 may be disposed in a line on the printed circuit board 55.

Referring to FIG. 12, the first light source 51 and the second light source 52 are alternately arranged on the printed circuit board 55. For example, the plurality of blue LEDs forming the first light source 51 and the plurality of cell regeneration LEDs forming the second light source 52 are alternately arranged on the printed circuit board 55 in a straight line.

The first light source 51 and the second light source 52 may be arranged one-to-one. In other words, the plurality of blue LEDs of the first light source 51 and the plurality of cell regeneration LEDs of the second light source 52 may be arranged one-to-one on the printed circuit board 55. Therefore, the plurality of blue LEDs and the plurality of cell regeneration LEDs may be disposed on the printed circuit board 55 in the same number.

The number of blue LEDs may be determined such that regardless of whether the second light source 52 is turned on or off, only the first light source 51 supplies enough light to the liquid crystal panel 10 so that the display apparatus 1 displays an image normally.

Alternatively, the number of the plurality of blue LEDs forming the first light source 51 and the number of the plurality of cell regeneration LEDs forming the second light source 52 may be disposed differently.

Figure 13:
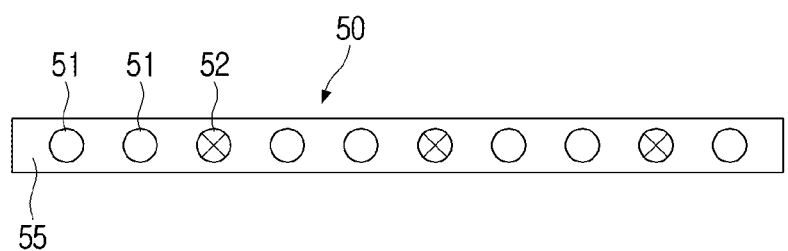
FIG. 13 is a view illustrating an example of a light source assembly used in the display apparatus of FIG. 11.

FIG. 13 is a view illustrating an example of a light source assembly used in the display apparatus of FIG. 11.

Referring to FIG. 13, the first light source 51 and the second light source 52 may be disposed on the printed circuit board 55 in a ratio of 2:1. In other words, one cell regeneration LED as the second light source 52 may be disposed for every two blue LEDs as the first light source 51.

In this embodiment, light emitted from the second light source 52 is not used to display an image. In other words, in this embodiment, only blue light emitted from the first light source 51 may be used to display an image.

Therefore, the number of the plurality of blue LEDs forming the first light source 51 may be determined such that regardless of whether the second light source 52 is turned on or off, only the first light source 51 supplies enough light to the liquid crystal panel 10 so that the display apparatus 1 normally displays an image.

The number of the plurality of cell regeneration LEDs forming the second light source 52 may be determined so as to give a cell regeneration effect to the human body when the plurality of cell regeneration LEDs are turned on.

The display apparatus 1 may include a first power supply part 91 that supplies power to the first light source 51, a second power supply part 92 that supplies power to the second light source 52, and a processor 90 configured to control the first power supply part 91 and the second power supply part 92. The first power supply part 91 is formed to supply current to the first light source 51. In other words, the first power supply part 91 is configured to supply current to the plurality of blue LEDs. When the maximum current is supplied to the first light source 51, that is, the plurality of blue LEDs by the first power supply part 91, the plurality of blue LEDs may emit blue light to the maximum. The second power supply part 92 is formed to supply current to the second light source 52. In other words, the second power supply part 92 is configured to supply current to the plurality of cell regeneration LEDs. When the maximum current is supplied to the second light source 52, that is, the plurality of cell regeneration LEDs by the second power supply part 92, the plurality of cell regeneration LEDs may emit light having maximum cell regeneration efficiency.

The first power supply part 91 and the second power supply part 92 may be formed separately. In other words, the first power supply part 91 may be formed not to supply current to the second light source 52, and the second power supply part 92 may be formed not to supply current to the first light source 51. When the first power supply part 91 and the second power supply part 92 are separated from each other, current supplied to the first light source 51 and current supplied to the second light source 52 may be separately controlled. Accordingly, it is possible to prevent or reduce overcurrent from flowing through the first light source 51 and the second light source 52. The processor 90 may be configured to control the first power supply part 91 and the second power supply part 92 to adjust the current supplied to the first light source 51 and the second light source 52. The processor 90 is similar to the processor 90 of the display apparatus 1 according to the above-described embodiment; therefore, a detailed description thereof is omitted.

According to the display apparatus 1 according to an example embodiment having the above structure, because the second light source 52 emits light having a cell regeneration effect, the display apparatus 1 may give a cell regeneration effect to the human body.

Hereinafter, a display apparatus 1 including a direct type backlight unit 40' according to an example embodiment will be described in detail with reference to FIG. 14.

Figure 14:
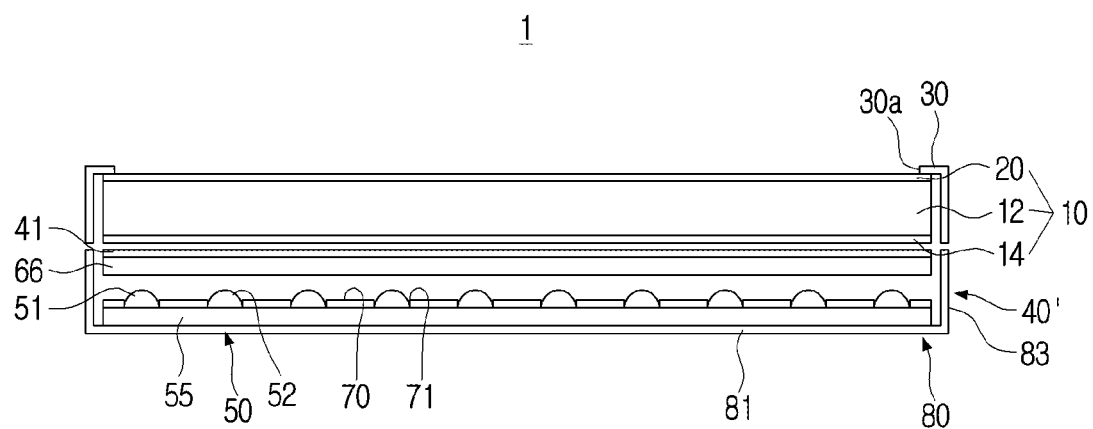
FIG. 14 is a cross-sectional view illustrating a display apparatus according to an example embodiment.

FIG. 14 is a cross-sectional view illustrating a display apparatus according to an example embodiment.

Referring to FIG. 14, a display apparatus 1 according to an example embodiment may include a liquid crystal panel 10 and a backlight unit 40' comprising a backlight.

The liquid crystal panel 10 includes a color filter 20, a thin film transistor layer 14, and a liquid crystal 12 provided between the color filter 20 and the thin film transistor layer 14. The liquid crystal panel 10 is the same as that of the display apparatus 1 according to the above-described embodiment;

therefore, a detailed description thereof is omitted.

The backlight unit 40' is formed as a direct type backlight unit 40'. The backlight unit 40' may include a diffusion plate 66, a light source assembly 50, a reflective sheet 70, and a lower chassis 80.

The diffusion plate 66, the reflective sheet 70, and the lower chassis 80 are the same as those of the direct type backlight unit 40' of the display apparatus 1 according to the above-described embodiment; therefore, a detailed description thereof is omitted. Hereinafter, the light source assembly 50 different from that of the display apparatus 1 according to the above-described embodiment will be described.

The light source assembly 50 is formed to generate light supplied to the liquid crystal panel 10. The light source assembly 50 is disposed under the diffusion plate 66. In other words, the light source assembly 50 is disposed on the bottom 81 of the lower chassis 80 below the diffusion plate 66.

Figure 15:
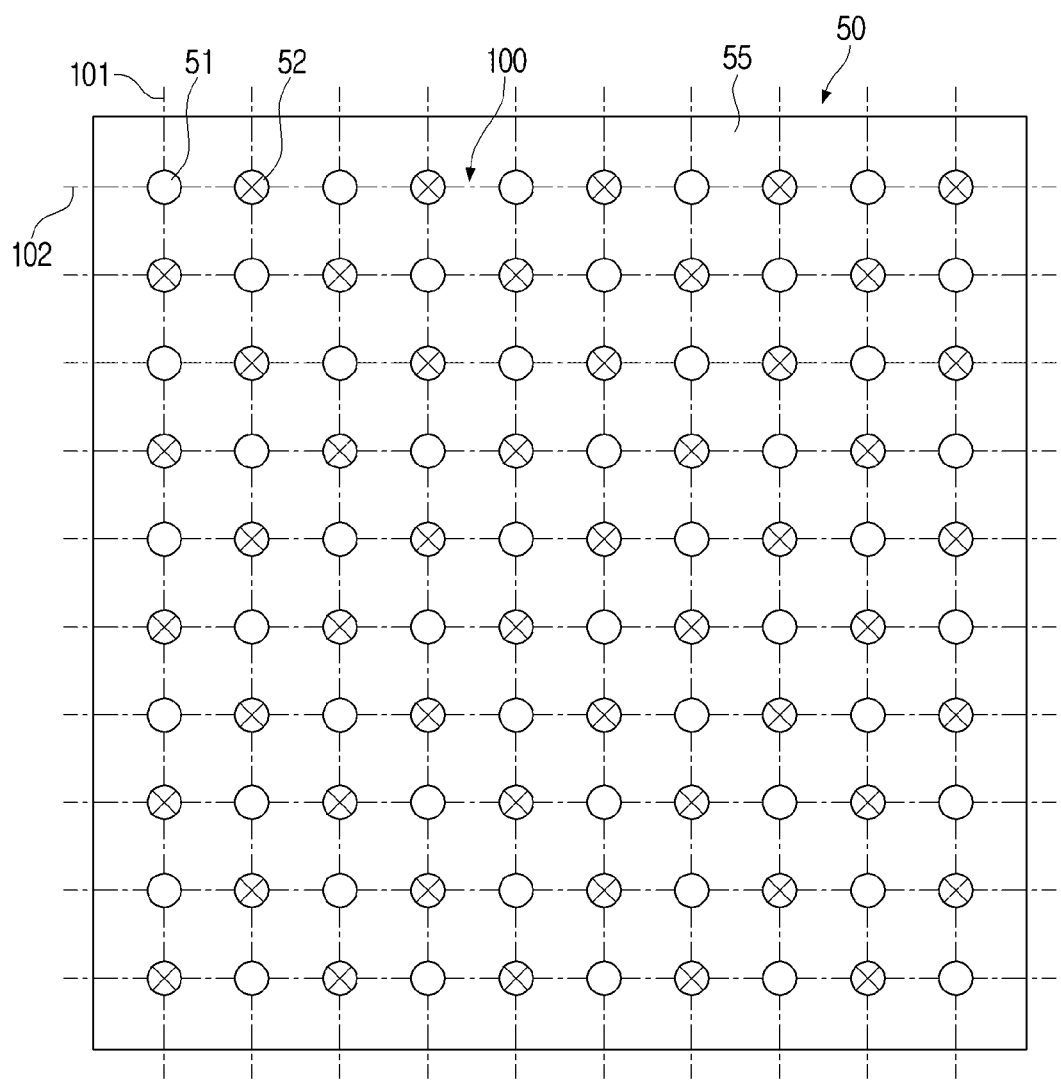
FIG. 15 is a view illustrating a light source assembly used in the display apparatus of FIG. 14.

FIG. 15 is a view illustrating a light source assembly used in the display apparatus of FIG. 14.

Referring to FIG. 15, the light source assembly 50 may be formed in a rectangular shape. The light source assembly 50 may include a first light source 51, a second light source 52, and a printed circuit board 55.

The first light source 51 may be formed to emit light having a central wavelength of 440 nm to 450 nm. For example, the first light source 51 may be formed of an LED emitting light having a central wavelength of 440 nm to 450 nm. The first light source 51 may include a plurality of blue LEDs emitting blue light having a wavelength of 440 nm to 450 nm.

The second light source 52 may be formed to emit light of a wavelength helpful for cell regeneration. For example, the second light source 52 may be formed of an LED emitting light having a wavelength of 600 nm to 1000 nm.

For example, the second light source 52 may be formed of an LED that emits light having any one of wavelengths of 620 nm, 680 nm, 780 nm, and 850 nm. Light having such a wavelength is known to be effective in hair loss, skin regeneration, vision regeneration, and the like. Light at these wavelengths may stimulate cellular mitochondrial enzymes to aid in ATP cell synthesis. Hereinafter, for convenience of description, if necessary, an LED emitting light having a wavelength of 600 nm to 1000 nm is referred to as a cell regeneration LED.

The printed circuit board 55 is provided with a circuit for driving the first light source 51 and the second light source 52. For example, the printed circuit board 55 is provided with a circuit configured to drive the plurality of blue LEDs as the first light source 51 and the plurality of cell regeneration LEDs as the second light source 52. The printed circuit board 55 is formed in a shape corresponding to the diffusion plate 66. For example, the printed circuit board 55 may be formed in a rectangular flat plate corresponding to the diffusion plate 66.

The first light source 51 and the second light source 52 are disposed at regular intervals on the upper surface of the printed circuit board 55 as illustrated in FIG. 15 to uniformly supply light to the diffusion plate 66. The first light source 51 and the second light source 52 may be alternately disposed on the printed circuit board 55.

Referring to FIG. 15, the plurality of blue LEDs forming the first light source 51 and the plurality of cell regeneration LEDs forming the second light source 52 are alternately arranged on the printed circuit board 55 in a straight line.

For example, the plurality of blue LEDs as the first light source 51 and the plurality of cell regeneration LEDs as the second light source 52 may be alternately arranged at intersections of a virtual grid pattern 100 formed by a plurality of virtual vertical lines 101 and a plurality of virtual horizontal lines 102 on the printed circuit board 55.

Accordingly, the plurality of blue LEDs as the first light source 51 and the plurality of cell regeneration LEDs as the second light source 52 are arranged in a straight line on the virtual vertical line 101. At this time, the plurality of blue LEDs and the plurality of cell regeneration LEDs are alternately arranged along the virtual vertical line 101.

In addition, the plurality of blue LEDs as the first light source 51 and the plurality of cell regeneration LEDs as the second light source 52 are arranged in a straight line on the virtual horizontal line 102. At this time, the plurality of blue LEDs and the plurality of cell regeneration LEDs are alternately arranged along the virtual horizontal line 102.

The first light source 51 and the second light source 52 may be arranged one-to-one. In other words, the plurality of blue LEDs as the first light source 51 and the plurality of cell regeneration LEDs as the second light source 52 may be arranged one-to-one on the printed circuit board 55. Therefore, the plurality of blue LEDs and the plurality of cell regeneration LEDs may be disposed on the printed circuit board 55 in the same number.

As another example, the number of blue LEDs forming the first light source 51 and the number of cell regeneration LEDs forming the second light source 52 may be different.

Figure 16:
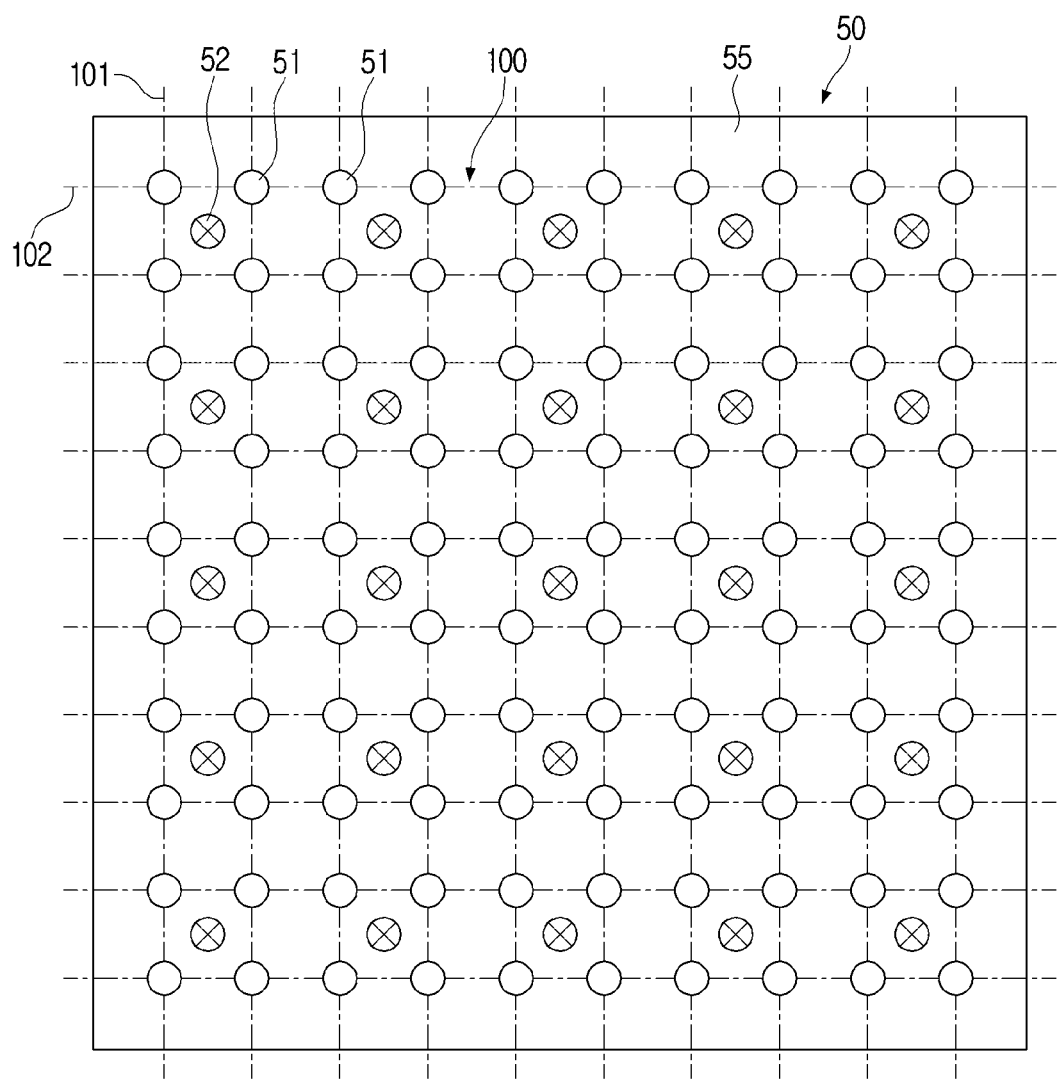
FIG. 16 is a view illustrating an example of a light source assembly used in the display apparatus of FIG. 14.

FIG. 16 is a view illustrating an example of a light source assembly used in the display apparatus of FIG. 14.

Referring to FIG. 16, the plurality of blue LEDs as the first light source 51 are arranged at intersections of a virtual grid pattern 100 formed by a plurality of virtual vertical lines 101 and a plurality of virtual horizontal lines 102 on the printed circuit board 55. The plurality of cell regeneration LEDs as the second light source 52 are respectively disposed at the center of a plurality of squares formed by four blue LEDs of the plurality of blue LEDs. However, the arrangement of the plurality of blue LEDs as the first light source 51 and the plurality of cell regeneration LEDs as the second light source 52 is not limited thereto. The plurality of blue LEDs and the plurality of cell regeneration LEDs may be arranged in various patterns as long as they can perform their functions.

In this embodiment, light emitted from the second light source 52 is not used to display an image. In other words, in this embodiment, only blue light emitted from the first light source 51 may be used to display an image. The display apparatus 1 may include a first power supply part 91 that supplies power to the first light source 51, a second power supply part 92 that supplies power to the second light source 52, and a processor 90 configured to control the first power supply part 91 and the second power supply part 92. Each processor herein comprises processing circuitry.

The first power supply part 91 is formed to supply current to the first light source 51. In other words, the first power supply part 91 is configured to supply current to a plurality of blue LEDs. When the maximum current is supplied to the first light source 51, that is, the plurality of blue LEDs by the first power supply part 91, the plurality of blue LEDs may emit blue light to the maximum.

The second power supply part 92 is formed to supply current to the second light source 52. In other words, the second power supply part 92 is configured to supply current to the plurality of cell regeneration LEDs. When the maximum current is supplied to the second light source 52, that is, the plurality of cell regeneration LEDs by the second power supply part 92, the plurality of cell regeneration LEDs may emit light having maximum cell regeneration efficiency.

The first power supply part 91 and the second power supply part 92 may be formed separately. In other words, the first power supply part 91 may be formed not to supply current to the second light source 52, and the second power supply part 92 may be formed not to supply current to the first light source 51. When the first power supply part 91 and the second power supply part 92 are separated from each other, current supplied to the first light source 51 and current supplied to the second light source 52 may be separately controlled. Accordingly, it is possible to prevent or reduce overcurrent from flowing through the first light source 51 and the second light source 52.

The processor 90 may be configured to control the first power supply part 91 and the second power supply part 92 to adjust the current supplied to the first light source 51 and the second light source 52. The processor 90 is similar to the processor 90 of the display apparatus 1 according to the above-described embodiment; therefore, a detailed description thereof is omitted.

According to the display apparatus 1 according to an example embodiment having the above structure, because the second light source 52 emits light having a cell regeneration effect, the display apparatus 1 may give a cell regeneration effect to the human body.

In the above description, the backlight unit 40 of the display apparatus 1 includes two types of light sources. However, the backlight unit 40 may include three or more types of light sources. Hereinafter, a display apparatus 1 in which the backlight unit 40 includes three types of light sources will be described with reference to FIGS. 17 to 23.

Figure 17:
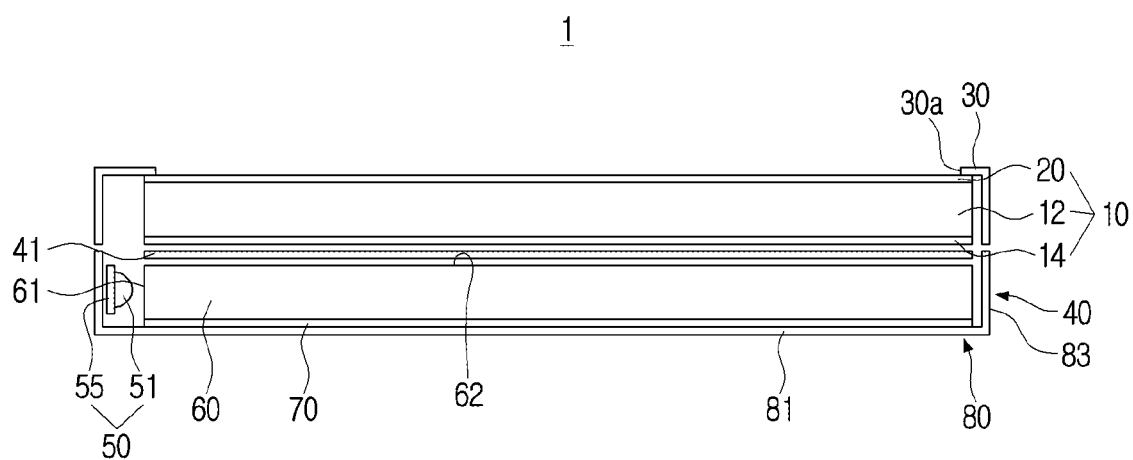
FIG. 17 is a cross-sectional view illustrating a display apparatus according to an example embodiment.

FIG. 17 is a cross-sectional view illustrating a display apparatus according to an example embodiment.

Referring to FIG. 17, a display apparatus 1 according to an example embodiment may include a liquid crystal panel 10 and a backlight unit 40. The liquid crystal panel 10 includes a color filter 20, a thin film transistor layer 14, and a liquid crystal 12 provided between the color filter 20 and the thin film transistor layer 14. The liquid crystal panel 10 is the same as that of the display apparatus 1 according to the above-described embodiment; therefore, a detailed description thereof is omitted.

The backlight unit 40 is formed as an edge type backlight unit 40. The backlight unit 40 may include a light guide plate 60, a light source assembly 50 disposed on one side of the light guide plate 60, a reflective sheet 70 disposed below the light guide plate 60, and a lower chassis 80 disposed below the reflective sheet 70.

The light guide plate 60, the reflective sheet 70, and the lower chassis 80 are the same as the edge type backlight unit 40 of the display apparatus 1 according to the above-described embodiment; therefore, detailed descriptions thereof are omitted. Hereinafter, the light source assembly 50 different from that of the display apparatus 1 according to the above-described embodiment will be described.

Figure 18:
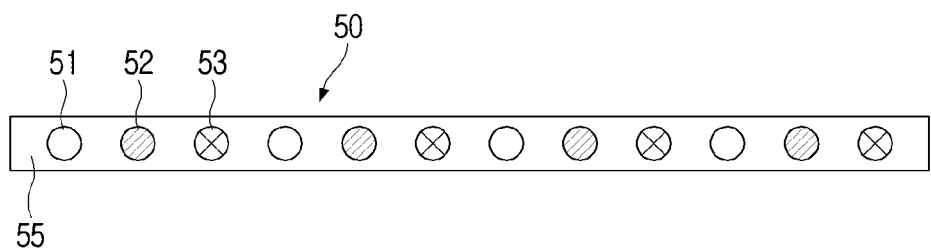
FIG. 18 is a view illustrating a light source assembly used in the display apparatus of FIG. 17.

FIG. 18 is a view illustrating a light source assembly used in the display apparatus of FIG. 17.

Referring to FIG. 18, the light source assembly 50 may be formed in a strip shape with a narrow width and a long length. The light source assembly 50 may include a first light source 51, a second light source 52, a third light source 53, and a printed circuit board 55.

The first light source 51 may be formed to emit light having a central wavelength of 440 nm to 450 nm. For example, the first light source 51 may be formed of an LED emitting light having a central wavelength of 440 nm to 450 nm. The first light source 51 may include a plurality of blue LEDs emitting blue light having a wavelength of 440 nm to 450 nm.

The second light source 52 may be formed to emit light having a central wavelength of 475 nm to 505 nm. For example, the second light source 52 may be formed of an LED emitting light having a central wavelength of 475 nm to 505 nm. The second light source 52 may include a plurality of sky blue LEDs emitting sky blue light having a wavelength of 475 nm to 505 nm.

The third light source 53 may be formed to emit light of a wavelength helpful for cell regeneration. For example, the third light source 53 may be formed of an LED emitting light having a wavelength of 600 nm to 1000 nm.

For example, the third light source 53 may be formed of an LED that emits light having any one of wavelengths of 620 nm, 680 nm, 780 nm, and 850 nm. Light having such a wavelength is known to be effective in hair loss, skin regeneration, vision regeneration, and the like. Light at these wavelengths may stimulate cellular mitochondrial enzymes to aid in ATP cell synthesis. Hereinafter, for convenience of description, if necessary, an LED emitting light having a wavelength of 600 nm to 1000 nm is referred to as a cell regeneration LED.

The printed circuit board 55 is provided with a circuit for driving the first light source 51, the second light source 52, and the third light source 53. For example, the printed circuit board 55 is provided with a circuit configured to drive a plurality of blue LEDs as the first light source 51, a plurality of sky blue LEDs as the second light source 52, and a plurality of cell regeneration LEDs as the third light source 53. The printed circuit board 55 is formed in a shape corresponding to one side surface 61 of the light guide plate 60. For example, the printed circuit board 55 may be formed in a strip shape with a narrow width and a long length.

The first light source 51, the second light source 52, and the third light source 53 may be disposed in a line on the printed circuit board 55.

Referring to FIG. 18, the first light source 51, the second light source 52, and the third light source 53 are alternately arranged on the printed circuit board 55. For example, the plurality of blue LEDs forming the first light source 51, the plurality of sky blue LEDs forming the second light source 52, and the plurality of cell regeneration LEDs forming the third light source 53 are alternately arranged on the printed circuit board 55 in a straight line. In other words, a blue LED, a sky blue LED, and a cell regeneration LED may be sequentially arranged on one surface of the printed circuit board 55 in this order.

The first light source 51, the second light source 52, and the third light source 53 may be arranged on the printed circuit board 55 in a 1:1:1 ratio. In other words, the plurality of blue LEDs as the first light source 51, the plurality of sky blue LEDs as the second light source 52, and the plurality of cell regeneration LEDs as the third light source 53 may be arranged on the printed circuit board 55 in the same number.

Alternatively, the number of the plurality of blue LEDs forming the first light source 51, the number of plurality of sky blue LEDs forming the second light source 52, and the number of the plurality of cell regeneration LEDs forming the third light source 53 may be different.

Figure 19:
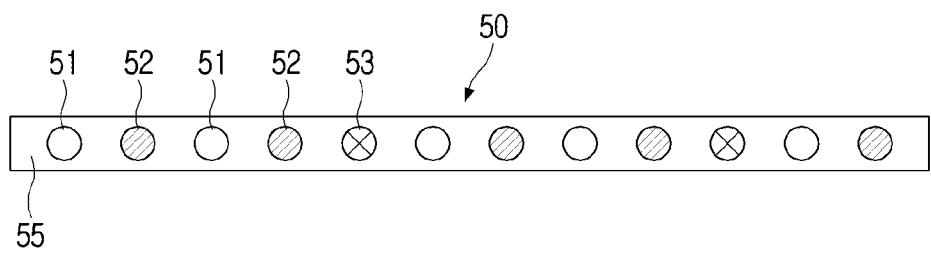
FIG. 19 is a view illustrating an example of a light source assembly used in the display apparatus of FIG. 17.

FIG. 19 is a view illustrating an example of a light source assembly used in the display apparatus of FIG. 17.

The number of the plurality of blue LEDs forming the first light source 51 may be determined such that when the second light source 52 and the third light source 53 are turned off, only the first light source 51 supplies enough light to the liquid crystal panel 10 so that the display apparatus 1 normally displays an image.

The number of the plurality of sky blue LEDs forming the second light source 52 may be determined such that when the plurality of sky blue LEDs are turned on, the human body senses the sky blue wavelength to suppress secretion of melatonin and secrete serotonin.

In addition, the number of the plurality of sky blue LEDs forming the second light source 52 may be determined such that when the plurality of sky blue LEDs are simultaneously turned on with the plurality of blue LEDs as the first light source 51, the first light source 51 and the second light source 52 supply enough light to the liquid crystal panel 10 so that the display apparatus 1 normally display an image. At this time, the third light source 53 may be turned on or off.

The number of the plurality of cell regeneration LEDs forming the third light source 53 may be determined so as to give a cell regeneration effect to the human body when the plurality of cell regeneration LEDs are turned on. Light emitted from the third light source 53 is not used for the display apparatus 1 to display an image.

Figure 20:
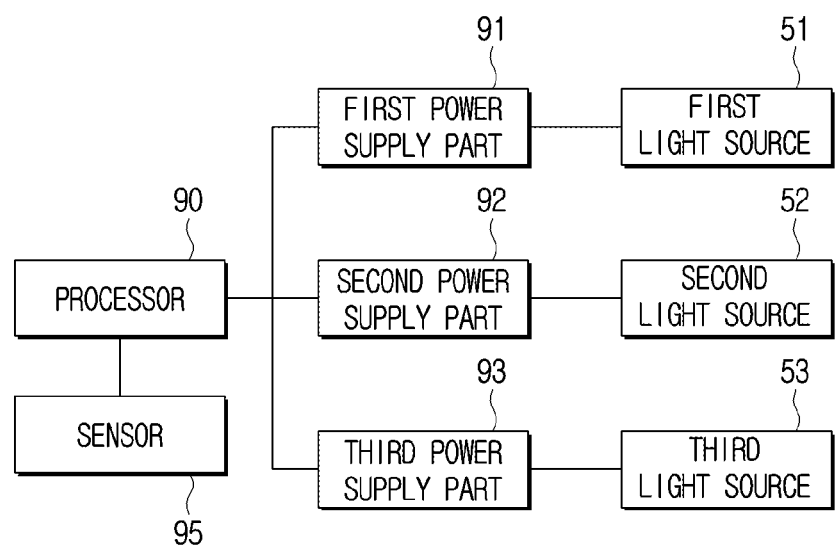
FIG. 20 is a block diagram illustrating a relationship between a processor, a first light source, a second light source, and a third light source of the display apparatus of FIG. 17.

The display apparatus 1 may include a first power supply part 91 that supplies power to the first light source 51, a second power supply part 92 that supplies power to the second light source 52, a third power supply part 93 that supplies power to the third light source 53, and a processor 90 configured to control the first power supply part 91, the second power supply part 92, and the third power supply part 93 (e.g., see FIG. 20).

FIG. 20 is a block diagram illustrating a relationship between a processor, a first light source, a second light source, and a third light source of the display apparatus of FIG. 17.

Referring to FIG. 20, the first power supply part 91 is formed to supply current to the first light source 51. In other words, the first power supply part 91 is configured to supply current to the plurality of blue LEDs forming the first light source 51. When the maximum current is supplied to the first light source 51, that is, the plurality of blue LEDs by the first power supply part 91, the plurality of blue LEDs may emit blue light to the maximum.

The second power supply part 92 is formed to supply current to the second light source 52. In other words, the second power supply part 92 is configured to supply current to the plurality of sky blue LEDs forming the second light source 52. When maximum current is supplied to the second light source 52, that is, the plurality of sky blue LEDs by the second power supply part 92, the plurality of sky blue LEDs may emit sky blue light to the maximum.

The third power supply part 93 is formed to supply current to the third light source 53. In other words, the third power supply part 93 is configured to supply current to the plurality of cell regeneration LEDs forming the third light source 53. When maximum current is supplied to the third light source 53, that is, the plurality of cell regeneration LEDs by the third power supply part 93, the plurality of cell regeneration LEDs may emit light having maximum cell regeneration efficiency.

The first power supply part 91, the second power supply part 92, and the third power supply part 93 may be formed separately. In other words, the first power supply part 91 may be formed not to supply current to the second light source 52 and the third light source 53. The second power supply part 92 may be formed not to supply current to the first light source 51 and the third light source 53. The third power supply part 93 may be formed not to supply current to the first light source 51 and the second light source 52. When the first power supply part 91, the second power supply part 92, and the third power supply part 93 are separated from each other, the current supplied to each of the first light source 51, the second light source 52, and the third light source 53 may be individually adjusted. Accordingly, it is possible to prevent or reduce overcurrent from flowing through the first light source 51, the second light source 52, and the third light source 53.

Although not illustrated, the first power supply part 91, the second power supply part 92, and the third power supply part 93 may receive power from an external power supply(s) connected, directly or indirectly, to the display apparatus 1.

The processor 90 may be configured to control the first power supply part 91, the second power supply part 92, and the third power supply part 93 to supply the current to the first light source 51, the second light source 52, and the third light source 53, respectively. The processor 90 may control the first power supply part 91 and the second power supply part 92 so that the first power supply part 91 and the second power supply part 92 simultaneously supply current to the first light source 51 and the second light source 52. In addition, the processor 90 may control the third power supply part 93 so that when the first power supply part 91 and the second power supply part 92 supply current to the first light source 51 and the second light source 52, the third power supply part 93 simultaneously supplies current to the third light source 53. In other words, the processor 90 may control the first power supply part 91, the second power supply part 92, and the third power supply part 93 to supply currents to the first light source 51, the second light source 52, and the third light source 53 at the same time.

In addition, the processor 90 may control the third power supply part 93 to current to the third light source 53 individually from the first power supply part 91 and the second power supply part 92. In other words, the processor 90 may control the third power supply part 93 to supply current to the third light source 53 in a state in which current is not supplied to the first light source 51 and the second light source 52, that is, in a state in which the first light source 51 and the second light source 52 are turned off. In this case, the user may use only the cell regeneration effect by the third light source 53 in a state where the display apparatus 1 does not display an image.

The processor 90 may control the first power supply part 91 and the second power supply part 92 so that the intensity of a first current supplied to the first light source 51 is different from the intensity of a second current supplied to the second light source 52. For example, the processor 90 may control the first power supply part 91 and the second power supply part 92 to supply a maximum or large current to the second light source 52 and a current less than the maximum or large current to the first light source 51. In addition, the processor 90 may control the third power supply part 93 to adjust the intensity of current supplied to the third light source 53.

The processor 90 may recognize sunrise and sunset using signals input from a sensor 95. An illuminance sensor capable of sensing external illuminance may be used as the sensor 95.

Alternatively, the processor 90 may use time to recognize sunrise and sunset. The processor 90 may be configured to recognize time. The user may set a sunrise time and a sunset time using a time setting part. Thus, the processor 90 may recognize sunrise and sunset using the set sunrise and sunset times and the current time.

The processor 90 may control the first power supply part 91 and the second power supply part 92. The processor 90 may control the first power supply part 91 and the second power supply part 92 using the recognized sunset and sunrise to adjust the current supplied to the first light source 51 and the second light source 52.

The processor 90 may control the third power supply part 93. The processor 90 may adjust the current supplied to the third light source 53 by controlling the third power supply part 93 according to the user's input received through a user input part.

With the display apparatus 1 according to an example embodiment having the above structure, the second light source 52 emits sky blue light, so that the human body suppresses the secretion of melatonin and secretes serotonin. Therefore, the human body may have a good effect.

In addition, with the display apparatus 1 according to an example embodiment, the third light source 53 emits light having a cell regeneration effect, so that the display apparatus 1 may give the cell regeneration effect to the human body. In addition, with the display apparatus 1 according to an example embodiment, because the first light source 51 formed of the plurality of blue LEDs and the second light source 52 formed of the plurality of sky blue LEDs operate simultaneously, the quality and brightness of a displayed image may be improved.

Hereinafter, a display apparatus 1 including a direct type backlight unit 40' according to an example embodiment will be described in detail with reference to FIG. 21.

Figure 21:
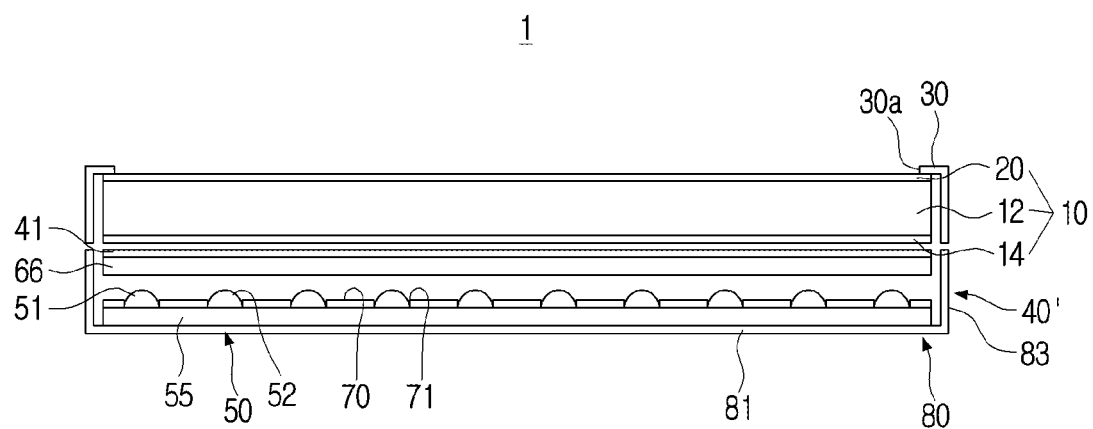
FIG. 21 is a cross-sectional view illustrating a display apparatus according to an example embodiment.

FIG. 21 is a cross-sectional view illustrating a display apparatus according to an example embodiment.

Referring to FIG. 21, a display apparatus 1 according to an example embodiment may include a liquid crystal panel 10 and a backlight unit 40'. The liquid crystal panel 10 includes a color filter 20, a thin film transistor layer 14, and a liquid crystal 12 provided between the color filter 20 and the thin film transistor layer 14. The liquid crystal panel 10 is the same as that of the display apparatus 1 according to the above-described embodiment; therefore, a detailed description thereof is omitted.

The backlight unit 40' is formed as a direct type backlight unit 40'. The backlight unit 40' may include a diffusion plate 66, a light source assembly 50, a reflective sheet 70, and a lower chassis 80.

The diffusion plate 66, the reflective sheet 70, and the lower chassis 80 are the same as those of the direct type backlight unit 40' of the display apparatus 1 according to the above-described embodiment; therefore, detailed descriptions thereof are omitted. Hereinafter, the light source assembly 50 different from that of the display apparatus 1 according to the above-described embodiment will be described.

Figure 22:
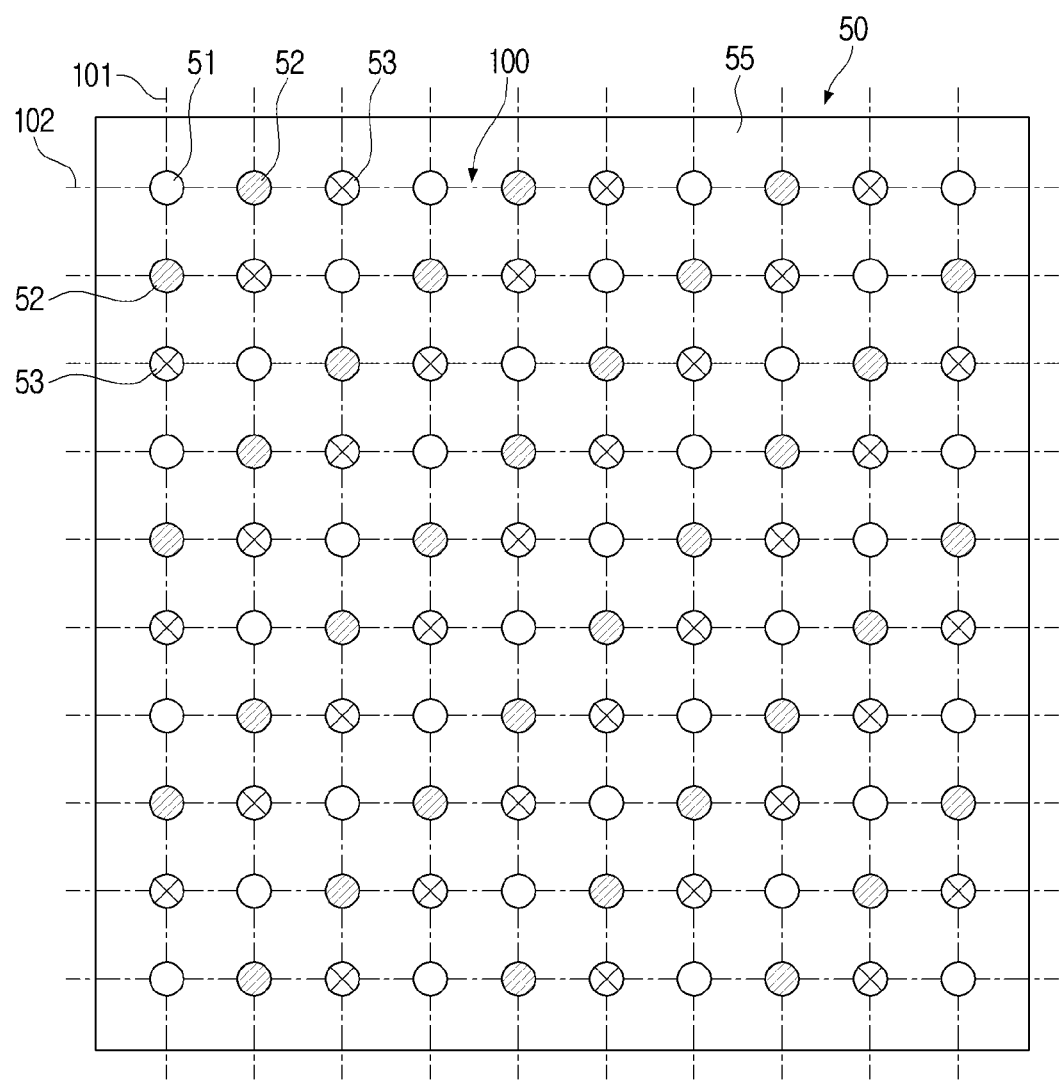
FIG. 22 is a view illustrating a light source assembly used in the display apparatus of FIG. 21.

The light source assembly 50 is formed to generate light supplied to the liquid crystal panel 10. The light source assembly 50 is disposed under the diffusion plate 66. In other words, the light source assembly 50 is disposed on the bottom 81 of the lower chassis 80 below the diffusion plate 66. FIG. 22 is a view illustrating a light source assembly used in the display apparatus of FIG. 21.

Referring to FIG. 22, the light source assembly 50 may be formed in a rectangular shape. The light source assembly 50 may include a first light source 51, a second light source 52, a third light source 53, and a printed circuit board 55.

The first light source 51 may be formed to emit light having a central wavelength of 440 nm to 450 nm. For example, the first light source 51 may be formed of an LED emitting light having a central wavelength of 440 nm to 450 nm. The first light source 51 may include a plurality of blue LEDs emitting blue light having a wavelength of 440 nm to 450 nm.

The second light source 52 may be formed to emit light having a central wavelength of 475 nm to 505 nm. For example, the second light source 52 may be formed of an LED emitting light having a central wavelength of 475 nm to 505 nm. The second light source 52 may include a plurality of sky blue LEDs emitting sky blue light having a wavelength of 475 nm to 505 nm. The third light source 53 may be formed to emit light of a wavelength helpful for cell regeneration. For example, the third light source 53 may be formed of an LED emitting light having a wavelength of 600 nm to 1000 nm.

For example, the third light source 53 may be formed of an LED that emits light having any one of wavelengths of 620 nm, 680 nm, 780 nm, and 850 nm. Light having such a wavelength is known to be effective in hair loss, skin regeneration, vision regeneration, and the like. Light at these wavelengths may stimulate cellular mitochondrial enzymes to aid in ATP cell synthesis. Hereinafter, for convenience of description, if necessary, an LED emitting light having a wavelength of 600 nm to 1000 nm is referred to as a cell regeneration LED.

The printed circuit board 55 is provided with a circuit for driving the first light source 51, the second light source 52, and the third light source 53. For example, the printed circuit board 55 is provided with a circuit configured to drive the plurality of blue LEDs as the first light source 51, the plurality of sky blue LEDs as the second light source 52, and the plurality of cell regeneration LEDs as the third light source 53. The printed circuit board 55 is formed in a shape corresponding to the diffusion plate 66. For example, the printed circuit board 55 may be formed in a rectangular flat plate corresponding to the diffusion plate 66.

The first light source 51, the second light source 52, and the third light source 53 are disposed at regular intervals on the upper surface of the printed circuit board 55 as illustrated in FIG. 22 to uniformly supply light to the diffusion plate 66. The first light source 51, the second light source 52, and the third light source 53 may be alternately disposed on the printed circuit board 55.

Referring to FIG. 22, the plurality of blue LEDs forming the first light source 51, the plurality of sky blue LEDs forming the second light source 52, and the plurality of cell regeneration LEDs forming the third light source 53 are alternately arranged on the printed circuit board 55 in a straight line. For example, the plurality of blue LEDs as the first light source 51, the plurality of sky blue LEDs as the second light source 52, and the plurality of cell regeneration LEDs as the third light source 53 may be alternately arranged at intersections of a virtual grid pattern 100 formed by a plurality of virtual vertical lines 101 and a plurality of virtual horizontal lines 102 on the printed circuit board 55.

In detail, the plurality of blue LEDs as the first light source 51, the plurality of sky blue LEDs as the second light source 52, and the plurality of cell regeneration LEDs as the third light source 53 are arranged in a line on the virtual vertical line 101. In other words, a blue LED, a sky blue LED, and a cell regeneration LED may be sequentially arranged in this order along the virtual vertical line 101 on one surface of the printed circuit board 55.

In addition, the plurality of blue LEDs as the first light source 51, the plurality of sky blue LEDs as the second light source 52, and the plurality of cell regeneration LEDs as the third light source 53 are arranged in a line on the virtual horizontal line 102. In other words, a blue LED, a sky blue LED, and a cell regeneration LED may be sequentially arranged in this order along the virtual horizontal line 102 on one surface of the printed circuit board 55. The first light source 51, the second light source 52, and the third light source 53 may be arranged on the printed circuit board 55 in a 1:1:1 ratio. In other words, the plurality of blue LEDs as the first light source 51, the plurality of sky blue LEDs as the second light source 52, and the plurality of cell regeneration LEDs as the third light source 53 may be disposed on the printed circuit board 55 in the same number.

Alternatively, the number of the plurality of blue LEDs forming the first light source 51, the number of the plurality of sky blue LEDs forming the second light source 52, and the number of the plurality of cell regeneration LEDs forming the third light source 53 may be different.

Each embodiment herein may be used in combination with any other embodiment(s) described herein.

Figure 23:
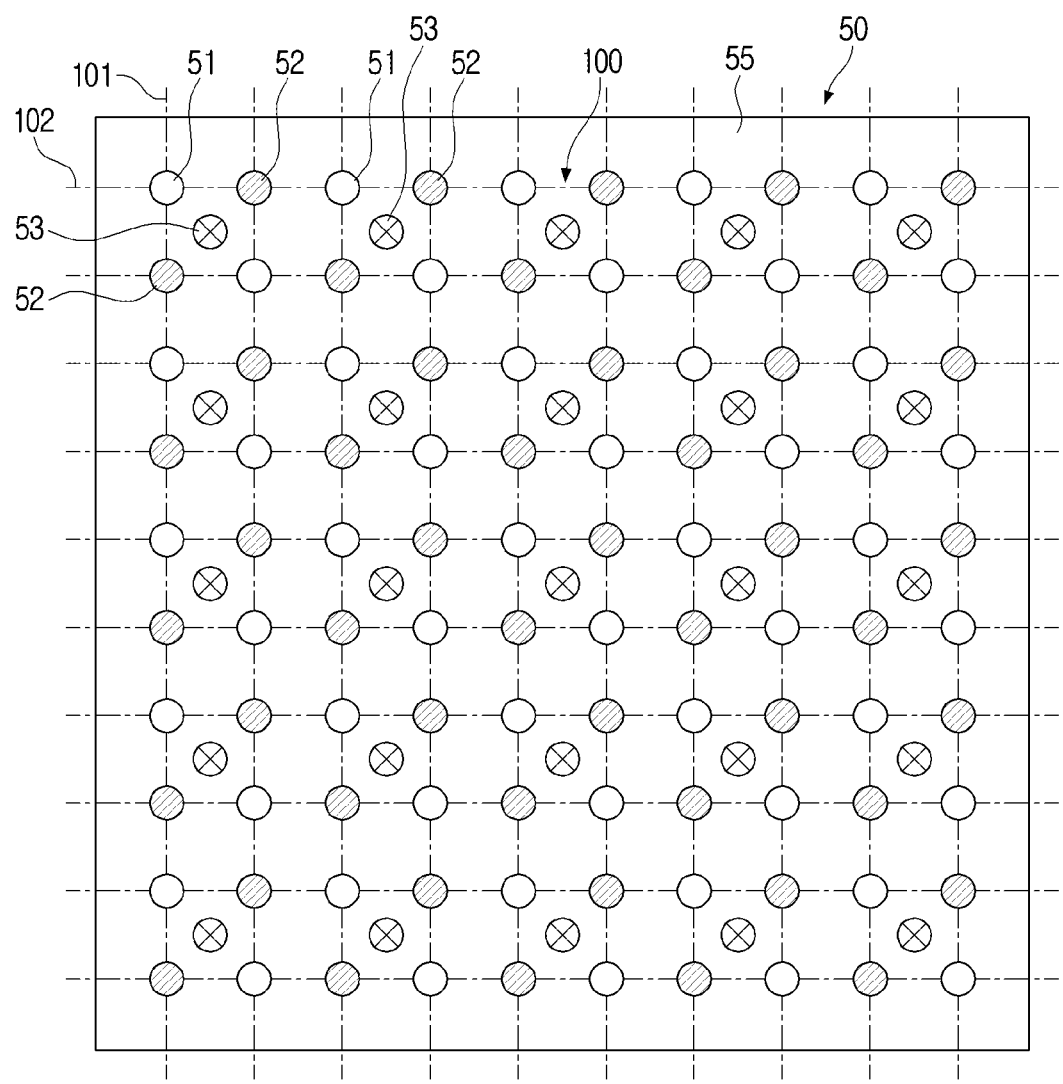
FIG. 23 is a view illustrating an example of a light source assembly used in the display apparatus of FIG. 21.

FIG. 23 is a view illustrating an example of a light source assembly used in the display apparatus of FIG. 21.

Referring to FIG. 23, a plurality of blue LEDs as the first light source 51 and a plurality of sky blue LEDs as the second light source 52 are alternately arranged at intersections of a virtual grid pattern 100 formed by a plurality of virtual vertical lines 101 and a plurality of virtual horizontal lines 102 on the printed circuit board 55. A plurality of cell regeneration LEDs as the third light source 53 are respectively disposed at the centers of a plurality of squares formed by two of the plurality of blue LEDs as the first light source 51 and two of the plurality of sky blue LEDs as the second light source 52.

However, the arrangement of the plurality of blue LEDs forming the first light source 51, the plurality of sky blue LEDs forming the second light source 52, and the plurality of cell regeneration LEDs forming the third light source 53 is not limited thereto. The plurality of blue LEDs, the plurality of sky blue LEDs, and the plurality of cell regeneration LEDs may be arranged in various patterns as long as they can perform their functions.

In this embodiment, light emitted from the third light source 53 is not used to display an image. In other words, in this embodiment, the blue light emitted from the first light source 51 and the sky blue light emitted from the second light source 52 may be used to display an image.

The display apparatus 1 may include a first power supply part 91 that supplies power to the first light source 51, a second power supply part 92 that supplies power to the second light source 52, a third power supply part 93 that supplies power to the third light source 53, and a processor 90 configured to control the first power supply part 91, the second power supply part 92, and the third power supply part 93.

The first power supply part 91, the second power supply part 92, the third power supply part 93, and the processor 90 are the same as those of display apparatus 1 according to the above embodiment described with reference to FIG. 20; therefore, detailed descriptions thereof are omitted. With the display apparatus 1 according to an example embodiment having the above structure, the second light source 52 emits sky blue light, so that the human body suppresses the secretion of melatonin and secretes serotonin. Therefore, the human body may have a good effect.

In addition, with the display apparatus 1 according to an example embodiment having the above structure, the third light source 53 emits light having a cell regeneration effect, so that the display apparatus 1 may give the cell regeneration effect to the human body.

In addition, with the display apparatus 1 according to an example embodiment, because the first light source 51 formed of a plurality of blue LEDs and the second light source 52 formed of a plurality of sky blue LEDs operate simultaneously, the quality and brightness of a displayed image may be improved.

As described above, an example embodiment may provide a display apparatus 1 considering the human biorhythm. In addition, an example embodiment may provide a display apparatus 1 to have a good effect on the human body.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A display apparatus comprising:
   a liquid crystal;
   a color filter overlapping the liquid crystal;
   a backlight unit configured to supply light to the liquid crystal, the backlight unit including a first light source for emitting light of a first wavelength and a second light source for emitting a second wavelength different from the first wavelength;
   a first power supply part configured to supply a first current to the first light source;
   a second power supply part configured to supply a second current to the second light source; and
   at least one processor, comprising processing circuitry, individually and/or collectively configured to:
   control the first power supply part and the second power supply part so that the first and second currents can be simultaneously supplied to the first light source and the second light source,
   control the first power supply part and the second power supply part so that intensity of the first current supplied to the first light source is different from intensity of the second current supplied to the second light source,
   during a time associated with a sunrise, control the first power supply part to gradually decrease the first current supplied to the first light source and control the second power supply part to gradually increase the second current supplied to the second light source from zero to a preset value, and
   during a time associate with a sunset, control the first power supply part to gradually increase the first current supplied to the first light source and control the second power supply part to gradually decrease the second current supplied to the second light source from the preset value to zero.

2. The display apparatus of claim 1, wherein
   the at least one processor is configured to determine a time of the sunrise and a time of the sunset based on a signal received from an illuminance sensor configured to sense external illuminance.

3. The display apparatus of claim 1, wherein
the first power supply part is formed separately from the second power supply part, and
the first power supply part is configured to supply current to the first light source.

4. The display apparatus of claim 1, wherein
the first light source is configured to emit light with a central wavelength within a range of 440 nm to 450 nm, and
the second light source is configured to emit light having a central wavelength within a range of 475 nm to 505 nm.

5. The display apparatus of claim 4, wherein
the first light source and the second light source each comprise a light emitting diode (LED).

6. The display apparatus of claim 1, wherein
the first light source includes a plurality of blue LEDs, and
the second light source includes a plurality of sky blue LEDs, and
the plurality of blue LEDs and the plurality of sky blue LEDs are alternately arranged.

7. The display apparatus of claim 6, wherein
the color filter comprises a red filter, a green filter, and a transparent portion.

8. The display apparatus of claim 7, wherein
the red filter and the green filter each comprise a quantum dot film.

9. The display apparatus of claim 6, wherein
the backlight unit further includes a light guide plate disposed under at least the liquid crystal, and
the first light source and the second light source are disposed on one side of the light guide plate.

10. The display apparatus of claim 9, wherein
the first light source includes a plurality of blue LEDs, and
the second light source includes a plurality of sky blue LEDs.

11. The display apparatus of claim 6, wherein
the backlight unit further includes a diffusion plate disposed under at least the liquid crystal, and
the first light source and the second light source are disposed below at least the diffusion plate.

12. The display apparatus of claim 11, wherein
the first light source includes a plurality of blue LEDs, and
the second light source includes a plurality of sky blue LEDs, and
the plurality of blue LEDs and the plurality of sky blue LEDs are alternately arranged.

13. The display apparatus of claim 1, wherein
the first light source is configured to emit light comprising a central wavelength within a range of 440 nm to 450 nm, and
the second light source is configured to emit light comprising a wavelength within a range of 600 nm to 1000 nm.

14. The display apparatus of claim 1, further comprising:
a third light source disposed in the backlight unit and configured to emit light having a wavelength different from those of the first light source and the second light source; and
a third power supply part configured to supply current to the third light source.

15. The display apparatus of claim 14, wherein
the at least one processor is configured to control the first power supply part, the second power supply part, and the third power supply part to simultaneously supply current to the first light source, the second light source, and the third light source.

16. The display apparatus of claim 1, wherein the at least one processor is configured to determine a time of the sunrise and a time of the sunset using a set sunrise time, a set sunset time and a current time.

17. The display apparatus of claim 1, wherein the time associated with the sunrise includes a period of time after the sunrise and the time associated with the sunset includes a period of time prior to the sunset.

18. The display apparatus of claim 1, wherein the intensity of the second current supplied to the first second light source is zero in a time period before the sunrise and after the sunset.

19. The display apparatus of claim 1, wherein
during the time associated with the sunrise, the first power supply part is controlled to gradually decrease the first current supplied to the first light source from a first value to a second value that is greater than zero, and
during the time associate with the sunset, the first power supply part is controlled to gradually increase the first current supplied to the first light source from the second value to the first value.

20. The display apparatus of claim 19, wherein
the first current is gradually decreased from the first value to the second value and the second current is gradually increased from zero to the preset value during a same first time period associated with the sunrise; and
the first current is gradually increased from the second value to the first value and the second current is gradually decreased from the preset value to zero during a same second time period associated with the sunrise.

* * * * *